US009881388B2

(12) United States Patent
Rorato et al.

(10) Patent No.: US 9,881,388 B2
(45) Date of Patent: Jan. 30, 2018

(54) COMPRESSION AND DECOMPRESSION OF A 3D MODELED OBJECT

(71) Applicant: Dassault Systemes, Velizy Villacoublay (FR)

(72) Inventors: Remy Rorato, Paris (FR); Nicolas Duny, Paris (FR)

(73) Assignee: Dassault Systemee, Velizy Villacoublay (FR)

( * ) Notice: Subject to any disclaimer, the term of this patent is extended or adjusted under 35 U.S.C. 154(b) by 730 days.

(21) Appl. No.: 14/286,952

(22) Filed: May 23, 2014

(65) Prior Publication Data
US 2014/0354636 A1  Dec. 4, 2014

(30) Foreign Application Priority Data

May 28, 2013 (EP) .................................... 13305700

(51) Int. Cl.
*G06T 9/00* (2006.01)
*G06T 9/20* (2006.01)

(52) U.S. Cl.
CPC ................ *G06T 9/001* (2013.01); *G06T 9/00* (2013.01); *G06T 9/20* (2013.01)

(58) Field of Classification Search
CPC .............. G06T 9/00; G06T 9/001; G06T 9/20
USPC ................................................. 345/419, 423
See application file for complete search history.

(56) References Cited

U.S. PATENT DOCUMENTS

| 6,721,614 B2 | 4/2004 | Duncan et al. |
| 6,768,928 B1 | 7/2004 | Nagasawa et al. |
| 6,778,970 B2 | 8/2004 | Au |
| 7,027,054 B1 | 4/2006 | Cheiky et al. |

(Continued)

FOREIGN PATENT DOCUMENTS

| CN | 1647112 | 7/2005 |
| CN | 101059335 | 10/2007 |

(Continued)

OTHER PUBLICATIONS

Mark Pauly, "Discovering structural regularity in 3D geometry", ACM Transactions on Graphics (TOG)—Proceedings of ACM SIGGRAPH 2008 TOG Homepage, vol. 27 Issue 3, Aug. 2008.*

(Continued)

*Primary Examiner* — Gregory J Tryder
*Assistant Examiner* — Michael Le
(74) *Attorney, Agent, or Firm* — Hamilton, Brook, Smith & Reynolds, P.C.

(57) ABSTRACT

It is provided a computer-implemented method for compressing a three-dimensional modeled object, wherein the method comprises providing a boundary representation of the modeled object; determining first data, that describe a mapping from the range of a reference function to the range of another function, and second data, that describe a mapping from the domain of the other function to the domain of the reference function which, when composed with the reference function and the mapping from the range of the reference function to the range of the other function, leads to the same result as applying the other function; and replacing in the geometrical data the other function by the first data, the second data and a pointer to the reference function. Such a method improves the compression of a 3D modeled object.

22 Claims, 7 Drawing Sheets

(56) References Cited

U.S. PATENT DOCUMENTS

| | | | |
|---|---|---|---|
| 7,269,808 | B2 | 9/2007 | Bruce et al. |
| 7,688,318 | B2 | 3/2010 | O'Malley, III et al. |
| 7,733,340 | B1 | 6/2010 | Desimone et al. |
| 8,812,272 | B2 | 8/2014 | Martin |
| 9,449,430 | B2 | 9/2016 | Janvier |
| 9,798,835 | B2 | 10/2017 | Rorato |
| 2002/0008700 | A1 | 1/2002 | Fuki |
| 2002/0095276 | A1 | 7/2002 | Rong et al. |
| 2003/0191627 | A1 | 10/2003 | Au |
| 2007/0279414 | A1* | 12/2007 | Vandenbrande ........ G06T 17/10 345/420 |
| 2008/0143714 | A1* | 6/2008 | Huang ..................... G06T 17/10 345/420 |
| 2009/0182450 | A1 | 7/2009 | Goldschmidt |
| 2011/0224813 | A1 | 9/2011 | Takatsuka |
| 2012/0078587 | A1 | 3/2012 | Martin et al. |
| 2014/0184594 | A1 | 7/2014 | Janvier |
| 2014/0188439 | A1 | 7/2014 | Rorato |
| 2014/0354636 | A1 | 12/2014 | Rorato et al. |
| 2016/0350335 | A1 | 12/2016 | Rorato |
| 2016/0350387 | A1 | 12/2016 | Marini et al. |

FOREIGN PATENT DOCUMENTS

| | | | |
|---|---|---|---|
| CN | 101995231 | | 3/2011 |
| EP | 0 646 884 | A2 | 4/1995 |
| EP | 0 646 884 | A3 | 7/1995 |
| EP | 0964364 | A2 * | 12/1999 ............. G06T 9/001 |
| EP | 2 169 567 | A2 | 3/2010 |
| EP | 2387004 | A1 | 11/2011 |
| WO | WO 2004/068300 | A2 | 8/2004 |
| WO | WO 2008/094170 | A1 | 8/2008 |
| WO | WO 2011/103031 | A1 | 8/2011 |
| WO | WO 2015/085435 | A1 | 12/2014 |

OTHER PUBLICATIONS

Munkres, Jarmes, R., "Elements of algebraic topology", Addison-Wesley Publishing Company, Inc. (1984).

Daras, P., et al., "A 3D Shape Retrieval Framework Supporting Multimodal Queries", Int J Comput Vis 89: 229-247 (2010).

Yang, M., et al., "A Survey of Shape Feature Extraction Techniques". Peng-Yeng Yin. Pattern Recognition, IN-TECH, pp. 43-90 (2008).

Petre, R.D., et al., "An experimental evaluation of view-based 2D/3D indexing methods", 2010 IEEE 26th Convention of Electrical and Electronics Engineers in Israel, Nov. 2010, Israel. pp. 924-928.

European Search Report in corresponding EP Application No. EP 13 30 5700 dated Aug. 14, 2013.

Author: Lujie Ma, et al. Title: Automatic discovery of common design structures in CAD models; Publisher: Computer & Graphics 34 (2010) 545-555.

3DPartFinder by 3DSemantix—Geometric search engine > Home; http://www.3dpartfinder.com, 2 pages.

Altmeyer, J. et al., "Reuse of Design Objects in CAD Frameworks," IEEE/ACM International Conference on Computer-Aided Design, Digest of Technical Papers, pp. 754-761 (Nov. 6, 1994).

Biasotti, S. et al., "Sub-part correspondence by structural descriptors of 3D shapes," Computer-Aided Design, 38(9): 1002-1019 (Sep. 2006).

Brière-Côté, Antoine et al., "Comparing 3D CAD Models: Uses, Methods, Tools and Perspectives," Computer-Aided Design & Applications, 9(6): 771-794 (2012).

Clark, D.E.R. et al., "Benchmarking shape signatures against human perceptions of geometric similarity," Computer-Aided Design, 38(9): 1038-1051 (Sep. 2006).

Cornelio A. et al., "Integration and Cataloging of Engineering Design Information," Systems Integration '90, IEEE Comput., Soc., US, pp. 720-729 (Apr. 23, 1990).

European Search Report, European Application No. EP 10 30 6026, Date of Completion of Search: Feb. 3, 2011, 8 pages.

Fonseca, M.J. et al., "Towards content-based retrieval of technical drawings through high-dimensional indexing," Computers and Graphics, 27(1): 61-69 (Feb. 2003).

Funkhouser, T. et al., "Modeling by Example," ACM Transactions on Graphics, 23(3): 652-663 (Aug. 1, 2004).

Funkhouser, Thomas et al., "A Search Engine for 3D Models," ACM Transactions on Graphics, vol. V, No. N, 10 202002, 28 Pages.

Imoru, C.O. et al., "On a Version of the Banach's Fixed Point Theorem," General Mathematics, vol. 16, Nr. 1, pp. 25-32 (2008).

Kazhdan, M. et al. "Harmonic 3D Shape Matching," ACM SIGGRAPH Symposium on Computer Animation, p. 191 (Jul. 21, 2002).

Kazhdan, Michael et al., "Rotation Invariant Spherical Harmonic Representation of 3D Shape Descriptors," Eurographics Symposium on Geometry Processing, 9 pages (2003).

Lee, K.S. et al., "Framework of an evolutionary design system incorporating design information and history," Computers in Industry, 44(3): pp. 205-227 (Apr. 2001).

Maranzana, Roland, "3D Data Mining Part and Information Re-Use in a PLM Context," Proceedings of GT2007, May 14-17, 2013, Montreal, Canada, ASME Paper: GT2007-27966, American Society of Mechanical Engineers, New York, NY, 2007. http://dx.doi.org/10.1115/GT2007-27966, 37 pages (2013).

Papadakis, P. et al, "Efficient 3D shape matching and retrieval using a concrete radialized spherical projection representation," ScienceDirect, 40: 2437-2452 (2007).

Shih, R., Parametric Modeling with Creo™ Parametric: An Introduction to Creo™ Parametric 1.0, SDC Publications © 2011 (table of contents only).

Creo™ Parametric Data Sheet, © 2011 Parametric Technology Corporation, available at http://www.creo.uk.com/creo_parametric_mapping.htm, last accessed Mar. 27, 2014.

Pauly, M., et al., "Discovering Structural Regularity in 3D Geometry," ACM Transactions on Graphics, 27(3):43:1-43:11 (2008).

Ismail, N., et al., "Feature Recognition Patterns for Form Features Using Boundary Representation Models," Int J Adv Manuf Technol, 20:553-556 (2002).

Kao, C.-Y., et al., "Extraction of 3D Object Features from CAD Boundary Representation Using the Super Relation Graph Method," IEEE Transactions on Pattern Analysis and Machine Intelligence, 17(12):1228-1233 (1995).

Werghi, N., "Extracting Ordered Patterns from a Triangular Mesh Surface", IEEE Potentials, IEEE, New York, NY, US, vol. 30, No. 6, Nov. 1, 2011, pp. 34-43.

Wang, D., et al., "EQSM: An Efficient High Quality Surface Grid Generation Method Based on Remeshing," Comput. Methods Appl. Mech. Engrg., 195:5621-5633 (2006).

Bespalov, D., et al.: "Local Feature Extraction and Matching Partial Objects", Computer Aided Design, Elsevier Publishers BV., Barking, GB, vol. 38, No. 9, Sep. 1, 2006, pp. 1020-1037.

Falcidieno, B., et al.: "A System for Extracting and Representing Feature Information Driven by the Application Context", Proceedings IEEE International Conference on Robotics and Automation, Jan. 1, 1990, pp. 1672-1678.

Santa-Cruz, D. et al., "Compression of Parametric Surfaces for Efficient 3D Model Coding", Visual Communications and Image Processing, San Jose, CA, 4671: 280-291 (Jan. 21-23, 2002).

Shikhare, D. et al., "Compression of Large 3D Engineering Models Using Automatic Discovery of Repeating Geometric Features", Vision, Modeling, and Visualization 2001 Proceedings, (Stuttgart, Germany), pp. 233-240, (Nov. 21-23, 2001).

Babic, Bojan et al., "A review of automated feature recognition with rule-based pattern recognition", Computers in Industry, 59: 321-337 (2008).

Working With Pattern Recognition [online], Retrieved from the Internet URL: http://learningexchange.ptc.com/tutorial/519/working-with-pattern-recognition.

Chiang, L., et al. "Identification of Patterns of Repeated Parts in Solid Objects", IMATI Report Series, pp. i-111, Nov. 2, 2016.

(56) References Cited

OTHER PUBLICATIONS

Dang, Q.V., et al., "Similarity Detection for Free-Form Parametric Models", 21st International Conference on Computer Graphics, Visualization and Computer Vision, pp. 239-248 (2013).
European Search Report for EP 16 30 6790 dated Jun. 7, 2017, 3 pages.
Gordon, L., "Comparing 3D CAD Modelers—What Designers should know about history-based and dynamic schemes", Machine Design, pp. 1-4, Nov. 22, 2006.
Beardsly, J., "Seamless Servers: The case for and against", Massively Multiplayer Game Development, Section 3.1, 211-227 (2003).
Boltcheve, D., "An Iterative Algorithm for Homology Computation on Simplical Shapes", Computer Aided Design, vol. 43, No. 11, pp. 1457-1467 Sep. 2, 2011.
Cardone, A., et al. "A Survey of Shape Similarity Assessment Algorithms for Product Design and Manufacturing Applications", Journal of Computing and Information Science in Engineering, vol. 3 No. 2, pp. 109-118, Jan. 1, 2003.
European Search Report for EP 12 30 6720 dated Jul. 4, 2013.
European Search Report for EP 12 30 6721 dated May 13, 2013.
European Search Report for EP 16 17 6763 dated Dec. 1, 2016.
European Search Report for EP 16 30 6488 dated May 23, 2017.
Frosini, P., et al. "Combining Persistent Homology and Invariance Groups for Shape Comparison", Discrete & Computational Geometry, vol. 55, No. 2, pp. 373-409, Feb. 2, 2016.
Oudot, S., Topological Signatures:, Presentation given in Springs School in LA Marsa, pp. 1-86, Apr. 2016.
Tangelder, J., et al., "A Survey of Content Based 3D Shape Retrieval Methods", Multimedia Tools and Applications, Kluwer Academic Publishers, vol. 39, No. 3, pp. 441-471; Dec. 8, 2007.
Wagner, et al. "Modeling Software with Finite State Machines" Auerbach Publications, 2006.

\* cited by examiner

COMPRESSION AND DECOMPRESSION OF A 3D MODELED OBJECT

RELATED APPLICATION(S)

This application claims priority under 35 U.S.C. § 119 or 365 to European Application No. 13305700, filed May 28, 2013. The entire teachings of the above application(s) are incorporated herein by reference.

FIELD OF THE INVENTION

The invention relates to the field of computer programs and systems, and more specifically to a method, system and program for compressing and/or decompressing a three-dimensional modeled (3D) modeled object, to a 3D modeled object obtainable by said compressing method, to a data structure describing said 3D modeled object, and to a data file storing said data structure.

BACKGROUND OF THE INVENTION

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behavior of a future product. CAM is an acronym for Computer-Aided Manufacturing, e.g. it relates to software solutions for defining manufacturing processes and operations. In such systems, the graphical user interface (GUI) plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise.

The PLM solutions provided by Dassault Systemes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

Many CAD systems now allow the user to design a 3D modeled object, based on a boundary representation (B-Rep) of the modeled object provided to the user. The B-Rep is a data format comprising a set of faces each defined as a bounded portion of a respective supporting surface. The user can act on the set of faces, by modifying existing faces, creating new faces, deleting some faces, and/or defining constraints on faces and/or between faces, or any actions of the like provided by the CAD system at use.

B-Reps may imply a high amount of data. Notably, B-Reps can comprise more and more elements in modern designs, leading to an increasing size of the data structures describing 3D modeled objects modeled by a B-Rep. A B-Rep of great size both takes a lot of memory space and is difficult to transmit. This is particularly an issue in the context of collaborative design. Therefore, compression methods have been developed to decrease the size of B-Reps.

Existing data compression methods of B-Rep models can be sorted into several categories. The first one deals with polygonal meshes, mainly triangles. Many research papers and patent documents are related to this technology. Document EP 0964364 A2 is a typical example. Not only the logical arrangement of triangles is compressed, but also numerical data such as point coordinates, normal vectors, texture codes and other attributes. The second category deals with accurate data, as opposed to approximate data. Accurate data compression deals with NURBS curves and surfaces as basic components of the B-Rep model. Control polygon of NURBS surface is compressed through an incremental definition of points coordinates. The variation of neighboring control points coordinates is "small" and can be coded with fewer digits because of the smoothness of NURBS surfaces involved in industrial applications. A typical example is document EP 2387004 A1. Other solutions comprise data structure preprocessing in order to make existing compression techniques more efficient. Document WO 2011/103031 A1 is an example.

However, at least some of these existing data compression methods may be inoperative in some cases. In any case, the compression ratio may be increased by a new compression technique acting differently from existing techniques.

Thus, the invention aims at improving the compression of 3D modeled objects.

SUMMARY OF THE INVENTION

According to one aspect, it is therefore provided a computer-implemented method for compressing a three-dimensional modeled object. The method comprises providing a boundary representation of the modeled object. The boundary representation comprises geometrical data. The geometrical data include functions each corresponding to a respective geometrical entity. Each function has a domain and a range. The method also comprises determining first data, that describe a mapping from the range of a reference function to the range of another function, and second data, that describe a mapping from the domain of the other function to the domain of the reference function which, when composed with the reference function and the mapping from the range of the reference function to the range of the other function, leads to the same result as applying the other function. And the method also comprises replacing in the geometrical data the other function by the first data, the second data and a pointer to the reference function.

The method may comprise one or more of the following:
  the method comprises determining sets of functions corresponding to geometrical entities that are a copy one of another, determining a reference function of the set within each set, repeating, for each set and for each function of the set other than the reference function of the set, the step of determining the first data and the second data and the step of replacing, the reference function of determining the first data and the second data being each time the reference function of the set;
  the functions comprise parametric functions, and the mapping from the range of the reference function to the range of the other function and the mapping from the domain of the other function to the domain of the reference function are affine mappings;
  the functions comprise surface definitions, the mapping from the range of the reference function to the range of the other function being a rigid motion that transforms the surface corresponding to the reference function into the surface corresponding to the other function, and the mapping from the domain of the other function to the domain of the reference function being a 2D local map;

the functions further comprise p-curves having a range included in the domain of a respective surface definition, the mapping from the range of the reference function to the range of the other function being the inverse of a 2D local map from the range of the other function to the range of the reference function, and the mapping from the domain of the other function to the domain of the reference function being a 1D local map; and/or the functions define faces that are a copy one of the other, with one reference surface definition, at least one other surface definition, a reference set of at least one p-curve having a range included in the domain of the reference surface definition and another set of at least one p-curve having a range in the domain of the other surface definition and corresponding to a respective one of the reference set, wherein the replacing includes replacing the other surface definition and the other set by data describing a pointer to the reference surface definition, for each one of the other set a pointer to the corresponding one of the reference set, a rigid motion that transforms the surface corresponding to the reference surface definition into the surface corresponding to the other surface definition, a 2D local map between the domain of the other surface definition to the domain of the reference surface definition, and a 1D local map between the domain of each one of the other set to the domain of the corresponding one of the reference set.

It is further proposed a three-dimensional modeled object obtainable by the above method for compressing.

It is further proposed a data file storing the above three-dimensional modeled object.

It is further proposed a computer-implemented method for decompressing said three-dimensional modeled object. The decompressing method comprises identifying the reference function with the pointer to the reference function; and composing the mapping from the domain of the other function to the domain of the reference function, the reference function, and then the mapping from the range of the reference function to the range of the other function.

It is further proposed a computer program comprising instructions for performing the above method for compressing and/or the above method decompressing. The computer program is adapted to be recorded on a computer readable storage medium.

It is further proposed a computer readable storage medium having recorded thereon the above computer program.

It is further proposed a CAD system comprising a processor coupled to a memory and a graphical user interface, the memory having recorded thereon the above computer program.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

Embodiments of the invention will now be described, by way of non-limiting example, and in reference to the accompanying drawings, where.

DETAILED DESCRIPTION OF THE INVENTION

A description of example embodiments of the invention follows.

The teachings of all patents, published applications and references cited herein are incorporated by reference in their entirety.

Figure 1:
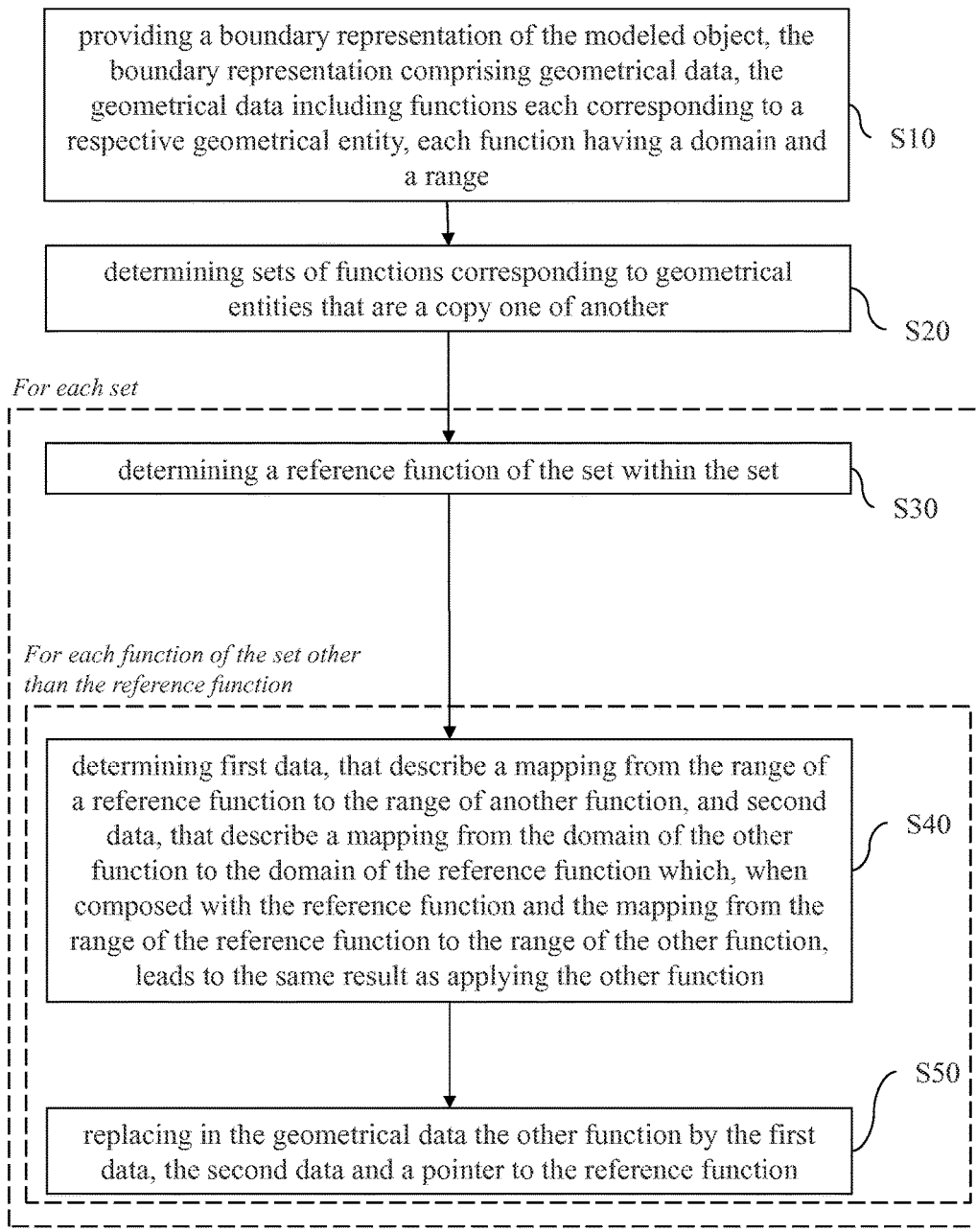
FIG. 1 shows a flowchart of an example of the method.

FIG. 1 shows a flowchart of an example of the computer-implemented method for compressing a 3D modeled object. The method comprises providing S10 a B-Rep of the modeled object. The B-Rep comprises geometrical data. The geometrical data include functions. Each function corresponds to a respective geometrical entity. Each function has a domain and a range. The method further comprises determining S40 first data and second data. The first data describe a mapping from the range of a reference function to the range of another function. The second data describe a mapping from the domain of the other function to the domain of the reference function. The second data are such that composing the mapping from the domain of the other function to the domain of the reference function described by the second data with the reference function and, then, the mapping from the range of the reference function to the range of the other function described by the first data, leads to the same result as applying the other function. The method further comprises replacing S50, in the geometrical data, the other function by the first data, the second data and a pointer to the reference function.

Such a method constitutes an improved solution for compressing a 3D modeled object. Indeed, by replacing a function, which may be formed by possibly complex and thus relatively large data, by data that describe mappings from (respectively to) the range (respectively the domain) of a first function to (respectively from) the range (respectively the domain) of a second function, and a pointer (e.g. any kind of pointer to a piece of data known in the field of computer science), which are data that are simple and thus relatively small, the method achieves compression of the geometrical data. Furthermore, this compression is based on the recognition at S40 of a geometrical link between a reference function and another function that allows the determining S40 and the subsequent replacement S50. Indeed, the reference function and the other function are linked by the fact that they correspond to copied geometrical entities. The method takes advantage of this geometrical link to replace, in the geometrical data, the data forming as such (i.e. independently of the rest of the functions) the other function by smaller data, that allow the computation of the other function based on the data forming the reference function and a pointer to the reference function. The method may thus be combined to other compression techniques known from the prior art without any interference, the method achieving compression as long as the geometrical link exists. This is all detailed in the following discussions.

Furthermore, the 3D modeled object thus compressed can be easily decompressed by a method for decompressing that comprises identifying the reference function with the pointer to the reference function. In other words, in the compressed data the method retrieves the reference function thanks to the pointer. Then, the method for decompressing comprises composing the mapping from the domain of the other function to the domain of the reference function (thanks to the second data describing it), the reference function, and then the mapping from the range of the reference function to the range of the other function (thanks to the first data describing it). In other words, the method for decompressing determines/computes a function that consists of the successive composition of the mapping from the domain of the other function to the domain of the reference function, the reference function, and then the mapping from the range of the reference function to the range of the other function (these three functions being applied in said successive order). This composed function provides the same geometrical result as the other function which was compressed by the method for compressing, and is thus geometrically identical to said other function.

A modeled object is any object defined/described by structured data that may be stored in a data file (i.e. a piece of computer data having a specific format) and/or on a memory of a computer system. By extension, the expression "modeled object" may designate the data structure itself. The method processes a 3D modeled object from an initial state of the 3D modeled object to a compressed state of the 3D modeled object by compressing the data structure describing it. Thus, the method "creates", or, outputs a compressed 3D modeled object, having a specific structure, due to the replacing S50. Notably, a 3D modeled object obtained by the method comprises a B-Rep comprising compressed geometrical data. The compressed geometrical data include functions each corresponding to a respective geometrical entity, each function having a domain and a range. The functions include at least one function, called "reference" function, stored as such (i.e. independently of the other functions, i.e. the reference function is applicable on its domain by the data defining it, without reference to other data). The compressed data also include some data (i.e. the first data) describing the mapping from the range of the reference function to the range of another function, some data (i.e. the second data) describing the mapping from the domain of the other function to the domain of the reference function mentioned earlier, and a pointer to the reference function. Thus, the other function may be applied by referring to the data defining the reference function. Such a compressed 3D modeled object, or the data structure describing such a 3D modeled object, or the data file storing such a data structure, carry the same geometrical information as the initial 3D modeled object with less memory space.

The method may be part of a method for designing the 3D modeled object, e.g. the method constituting the ending steps of such a designing method. "Designing a 3D modeled object" designates any action or series of actions which is at least part of a process of elaborating a 3D modeled object. Thus, the method may comprise creating the 3D modeled object from scratch. Alternatively, the method may comprise providing a 3D modeled object previously created, and then modifying the 3D modeled object.

The 3D modeled object may be a CAD modeled object or a part of a CAD modeled object. In any case, the 3D modeled object designed by the method may represent the CAD modeled object or at least part of it, e.g. a 3D space occupied by the CAD modeled object. A CAD modeled object is any object defined by data stored in a memory of a CAD system. According to the type of the system, the modeled objects may be defined by different kinds of data.

A CAD system is any system suitable at least for designing a modeled object on the basis of a graphical representation of the modeled object, such as CATIA. Thus, the data defining a CAD modeled object comprise data allowing the representation of the modeled object (e.g. geometric data, for example including relative positions in space).

The method may be included in a manufacturing process, which may comprise, after performing the method, producing a physical product corresponding to the modeled object. In any case, the modeled object designed by the method may represent a manufacturing object. The modeled object may thus be a modeled solid (i.e. a modeled object that represents a solid). The manufacturing object may be a product, such as a part, or an assembly of parts. Because the method improves the design of the modeled object by allowing a better compression, the method also improves the manufacturing of a product and thus increases productivity of the manufacturing process. The method can be implemented using a CAM system, such as DELMIA. A CAM system is any system suitable at least for defining, simulating and controlling manufacturing processes and operations.

The method is computer-implemented. This means that the method is executed on at least one computer, or any system alike. For example, the method may be implemented on a CAD system. Thus, steps of the method are performed by the computer, possibly fully automatically, or, semi-automatically (e.g. steps which are triggered by the user and/or steps which involve user-interaction). Notably, the providing S10 and/or the determining S20 (discussed later) may be triggered by the user. Other steps of the method may be performed automatically (i.e. without any user intervention), or semi-automatically (i.e. involving, e.g. light, user-intervention, for example for validating results).

A typical example of computer-implementation of the method is to perform the method with a system suitable for this purpose. The system may comprise a memory having recorded thereon instructions for performing the method. In other words, software is already ready on the memory for immediate use. The system is thus suitable for performing the method without installing any other software. Such a system may also comprise at least one processor coupled with the memory for executing the instructions. In other words, the system comprises instructions coded on a memory coupled to the processor, the instructions providing means for performing the method. Such a system is an efficient tool for compressing a 3D modeled object.

Such a system may be a CAD system. The system may also be a CAE and/or CAM system, and the CAD modeled object may also be a CAE modeled object and/or a CAM modeled object. Indeed, CAD, CAE and CAM systems are not exclusive one of the other, as a modeled object may be defined by data corresponding to any combination of these systems.

The system may comprise at least one GUI for launching execution of the instructions, for example by the user. Notably, the GUI may allow the user to trigger the step of providing S10, and then, if the user decides to do so, e.g. by launching a specific function (e.g. entitled "compression"), to trigger the rest of the method, e.g. including the determining S20 in an example provided later.

The 3D modeled object is 3D (i.e. three-dimensional). This means that the modeled object is defined by data allowing its 3D representation. Notably, the geometrical entities to which the functions of the B-Rep correspond are 3D (i.e. they are defined in 3D, such that the union of all geometrical entities may be non-planar). A 3D representation allows the viewing of the representation from all angles.

For example, the modeled object, when 3D represented, may be handled and turned around any of its axes, or around any axis in the screen on which the representation is displayed. This notably excludes 2D icons, which are not 3D modeled, even when they represent something in a 2D perspective. The display of a 3D representation facilitates design (i.e. increases the speed at which designers statistically accomplish their task). This speeds up the manufacturing process in the industry, as the design of the products is part of the manufacturing process.

Figure 2:
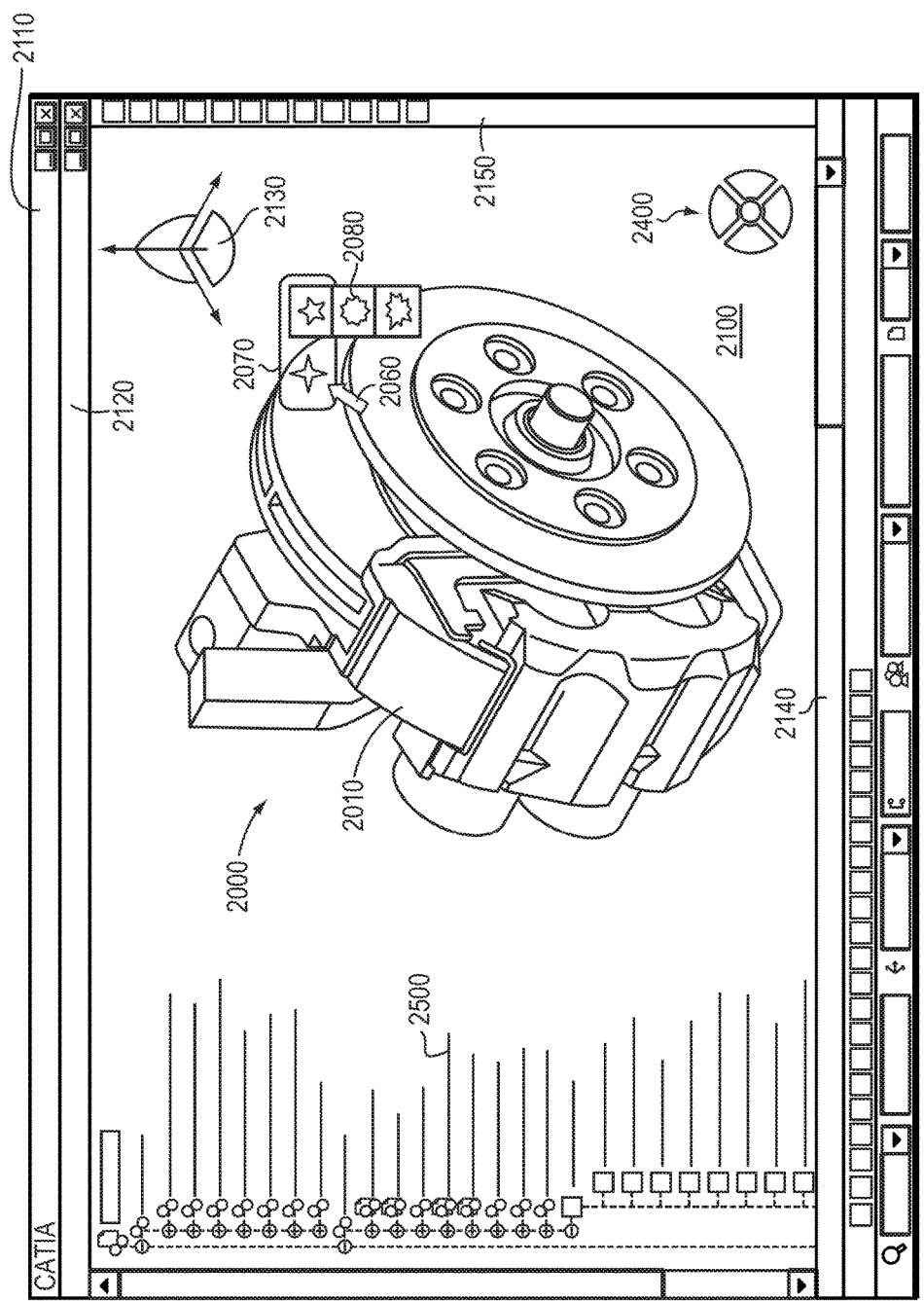
FIG. 2 shows an example of a graphical user interface.

FIG. 2 shows an example of the GUI of a typical CAD system.

The GUI 2100 may be a typical CAD-like interface, having standard menu bars 2110, 2120, as well as bottom and side toolbars 2140, 2150. Such menu and toolbars contain a set of user-selectable icons, each icon being associated with one or more operations or functions, as known in the art. Some of these icons are associated with software tools, adapted for editing and/or working on the 3D modeled object 2000 displayed in the GUI 2100. The software tools may be grouped into workbenches. Each workbench comprises a subset of software tools. In particular, one of the workbenches is an edition workbench, suitable for editing geometrical features of the modeled product 2000. In operation, a designer may for example pre-select a part of the object 2000 and then initiate an operation (e.g. a sculpting operation, or any other operation such as a change of dimension, color, etc.) or edit geometrical constraints by selecting an appropriate icon. For example, typical CAD operations are the modeling of the punching or the folding of the 3D modeled object displayed on the screen.

The GUI may for example display data 2500 related to the displayed product 2000. In the example of FIG. 2, the data 2500, displayed as a "feature tree", and their 3D representation 2000 pertain to a brake assembly including brake caliper and disc. The GUI may further show various types of graphic tools 2130, 2070, 2080 for example for facilitating 3D orientation of the object, for triggering a simulation of an operation of an edited product or rendering various attributes of the displayed product 2000. A cursor 2060 may be controlled by a haptic device to allow the user to interact with the graphic tools.

Figure 3:
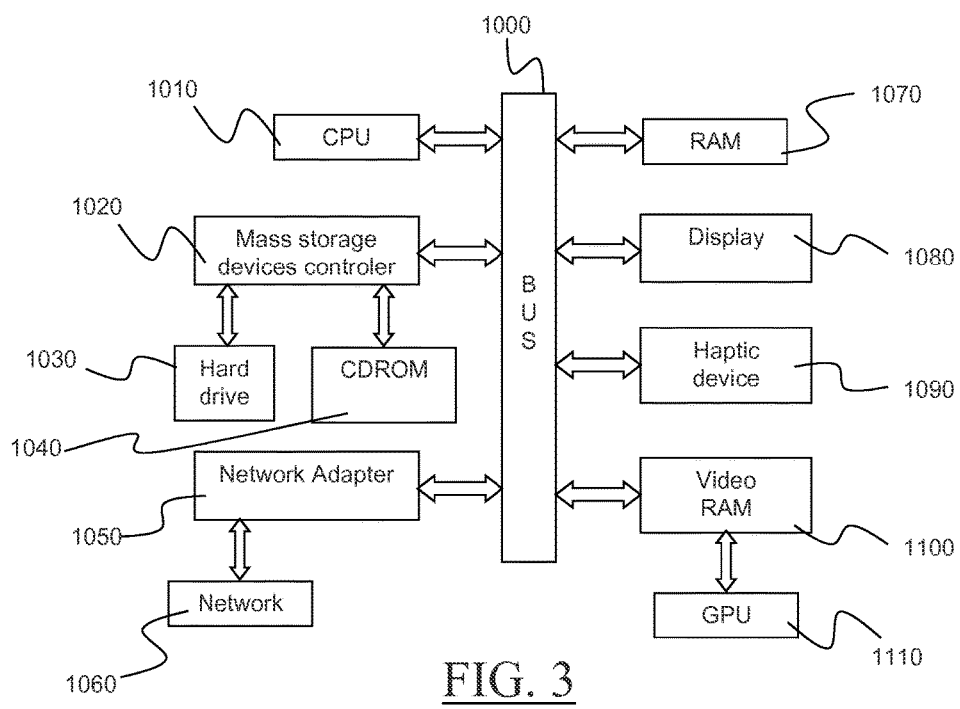
FIG. 3 shows an example of a client computer system.

FIG. 3 shows an example of the architecture of the system as a client computer system, e.g. a workstation of a user.

The client computer comprises a central processing unit (CPU) 1010 connected to an internal communication BUS 1000, a random access memory (RAM) 1070 also connected to the BUS. The client computer is further provided with a graphics processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks, magneto-optical disks, and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as a cursor control device, a keyboard or the like. A cursor control device is used in the client computer to permit the user to selectively position a cursor at any desired location on screen 1080, as mentioned with reference to FIG. 2. By screen, it is meant any support on which displaying may be performed, such as a computer monitor. In addition, the cursor control device allows the user to select various commands, and input control signals. The cursor control device includes a number of signal generation devices for input control signals to system. Typically, a cursor control device may be a mouse, the button of the mouse being used to generate the signals.

To cause the system to perform the method, it is provided a computer program comprising instructions for execution by a computer, the instructions comprising means for this purpose. The program may for example be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The instructions may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language. The program may be a full installation program, or an update program. In the latter case, the program updates an existing CAD system to a state wherein the system is suitable for performing the method.

The providing S10 is now discussed.

The method comprises providing S10 a B-Rep of the modeled object. The providing S10 may result from a designer working on a modeled object (in this case on its boundary representation), or from the fact that the method may be applied to already existing B-Reps, e.g. retrieved in existing libraries. The modeled object is in any case provided at S10 as a B-Rep. The boundary representation is a widely known format for modeling a 3D object in terms of its envelop (i.e. its outer surfaces). The B-Rep thus designates data of a specific format that may comprise geometrical data and topological data. Geometrical data are data that provide geometrical entities, which are entities described in terms of 3D positions. Topological data are data that provide topological entities, which are entities described in terms of references to geometrical entities and/or relationships with other topological entities, e.g. relative positioning. Typically, the relationships may include an "is bounded by" relationship that associates a topological entity to other topological entities by which it is topologically bounded.

Topological data may include faces, edges, and/or vertices. Geometrical data may include functions such as surface definitions, p-curves and/or p-vertices. Geometrical data may also include curves and/or vertices. A surface definition (also called "surface", as its image, for conciseness) is a function from a 2D domain to a 3D space. A curve is a function of a 1D domain to a 3D space. A vertex is a specific set of coordinates of a 3D space. From the mathematical point of view, a p-curve is a curve lying on a surface. A p-curve is thus a function from a 1D domain to the 2D domain of a surface definition. From the B-Rep model point of view, p-curves are used to materialize boundaries of faces. From the mathematical point of view, a p-vertex is a point lying on a p-curve or a surface. A p-vertex is thus a specific parameter of the 1D domain of a p-curve or a specific couple of parameters of the 2D domain of a surface. From the B-Rep model point of view, p-vertices are used to materialize boundaries of edges. In the following, the word "surface" may be used for planes as well as non-planar surfaces. Similarly, the word "p-curve" may be used for lines as well as non-linear p-curves.

By definition, a face is a bounded portion of a surface, named the supporting surface. Thus, a face corresponds to a geometrical element (i.e. a set of at least one geometrical entity) comprising all the geometrical entities that take part in describing the face. Such geometrical element may also be called "face" for conciseness. The boundary of a face includes edges. Each such edge is a bounded portion of a p-curve, named the supporting p-curve, and laying on the supporting surface of the face. The boundary of the edge includes two vertices. Each vertex is a point laying on the edge. By definition, two faces are adjacent if they share at least one edge. Similarly, two edges are adjacent if they share at least one vertex. In the B-Rep solid model of a mechanical part, all edges are shared by exactly two faces. Conversely, in the B-Rep model of a skin, some edges are shared by two faces while some others are border edges and belong to exactly one face.

It must be understood that, from the topological point of view, an edge e that is shared by two faces $F_1$ and $F_2$ is a single object. Conversely, from the geometrical point of view, such an edge is a compound object that gathers the following entities: a p-curve defined on the supporting surface $S_1$ of face $F_1$ and another p-curve defined on the supporting surface $S_2$ of face $F_2$. Similarly, from the topological point of view, a vertex v that is shared by edges $e_1$, $e_2$, ..., $e_n$ is a single object. Conversely, from the geometrical point of view, such a vertex is a compound object gathering p-vertices defined on all p-curves of each edge $e_i$.

The geometrical data thus includes functions (e.g. surfaces—or "surface definitions"—, p-curves and/or curves, with the domains and ranges described above), that each corresponds to a respective geometrical entity. Indeed, a surface definition corresponds to the geometrical surface consisting of the image of the surface function. Similarly, a curve corresponds to the geometrical curve consisting of the image of the curve function. A p-curve corresponds to a curve consisting of the image of the function compounding the p-curve function and then the surface function on which the curve lies. This is described later through an example.

These functions may typically be parametric function, such as NURBS. For example, supporting surfaces may typically be NURBS surfaces, but also planar, canonical or procedural surfaces. And the (e.g. topological) data may include at least a set of faces, each face being defined as a bounded portion of a respective supporting surface (provided in the geometrical data). Thus, a face corresponds to a trimmed surface. The supporting surfaces are thus surfaces on which the faces are defined (thereby "supporting" the faces), in any way, by a trimming operation.

The notion of B-Rep, although widely known, is now further discussed through an example of a modeled object that may be provided at S10. Other examples of B-Reps, for example with relationships different from the "is bounded by" relationship, for at least some topological entities, may however be contemplated by the method.

As already mentioned, a B-Rep of a modeled object may include topological entities and geometrical entities. The geometrical entities may comprise 3D objects that are surfaces (e.g. planes), curves (e.g. lines) and/or points. Surfaces may be provided as functions of two parameters. Curves may simply be provided as functions of one parameter. And points may be provided as 3D positions. The topological entities may comprise faces, edges, and/or vertices. By its definition, a face corresponds to a bounded portion of a respective surface, named the supporting surface. The term "face" may thus indifferently designate such bounded portion of the surface or the corresponding bounded portion of the 2D domain. Similarly, an edge corresponds to a bounded portion of a curve, named e.g. the supporting curve. The term "edge" may thus designate such bounded portion of the curve or of its domain. A vertex may be defined as a link to a point in 3D space. These entities are related to each other as follows. The bounded portion of a curve is defined by two points (the vertices) lying on the curve. The bounded portion of a surface is defined by its boundary, this boundary being a set of edges lying on the surface. Edges of the face's boundary are connected together by sharing vertices. Faces are connected together by sharing edges. By definition, two faces are adjacent if they share an edge. Similarly, two edges are adjacent if they share a vertex. Surfaces, curves, and points may be linked together via their parameterization. For example, a value of the parameter of the parametric function defining a curve may be provided to define a bounding vertex. Similarly, a function linking the parameter of a curve to the two parameters of a surface may be provided to define a bounding edge. However, the very detailed structure of such topological data of a B-Rep is out of the scope of the present explanations.

Figure 4:
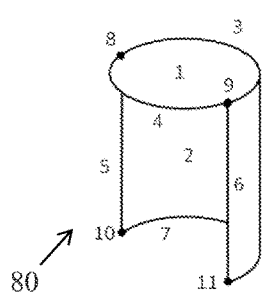
FIGS. 4-27 show examples of the method.
Figure 5:
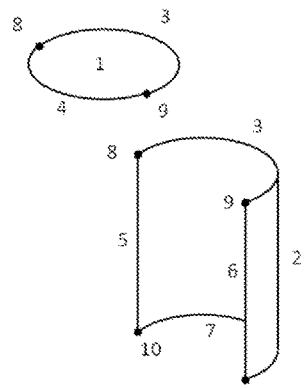

FIGS. 4 and 5 illustrate the B-rep model of a partial cylindrical slot 80 that may be the modeled object provided at S10 and that is made of two adjacent faces numbered 1 and 2 in the figures: top planar face 1 and lateral cylindrical face 2. FIG. 4 shows a perspective view of slot 80. FIG. 5 shows the exploded view of the faces. Duplicated numbers illustrate edges and vertices sharing. Face 1 is a bounded portion of a plane. Boundary of face 1 includes edges 3 and 4, each of them being bounded by vertices 8 and 9. Face 2 is bounded by edges 3, 5, 6 and 7 all laying on an infinite cylindrical surface. Faces 1 and 2 are adjacent because they share edge 3.

Figure 6:
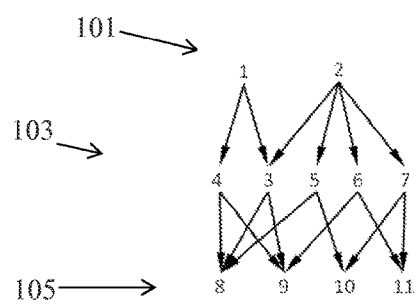
Figure 7:
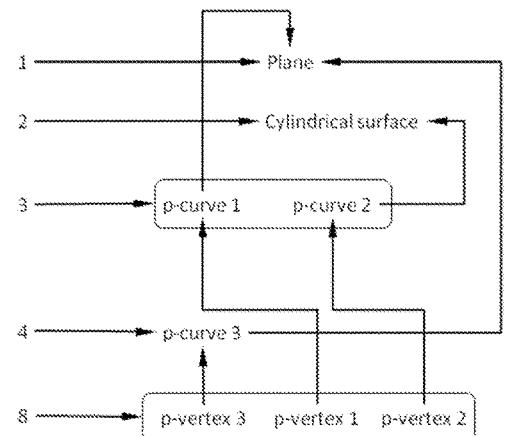
Figure 8:
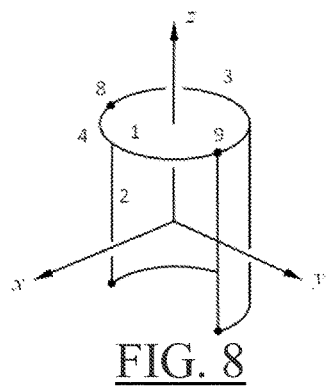

FIG. 6 illustrates the "is bounded by" topological relationship of the B-rep model of slot 80. Nodes of higher layer 101 are faces, nodes of intermediate layer 103 are edges and nodes of lower layer 105 are vertices. FIG. 7 partially illustrates the relationships between topological entities (faces 1 and 2, edges 3 and 4, vertex 8) and geometrical entities, which are surfaces, curves corresponding to p-curves and vertices corresponding to p-vertices. On FIG. 7, rightwards arrows, from topological objects to geometrical objects, capture the "is supported by" relationship. Upwards arrows linking geometrical objects to higher dimensional geometrical objects capture the "is embedded in" relationship. By setting an xyz axis as illustrated on FIG. 8, the functions (i.e. formulas) of the geometrical model can be given explicitly in the following table. Cylinder radius is noted r and height of the plane is noted $z_0$.

| B-Rep model name | Supported topological entity | Mathematical name and domain | Mathematical definition |
|---|---|---|---|
| Cylindrical surface | Face 2 | $C: [0, 2\pi[ \times \mathbb{R} \to \mathbb{R}^3$ | $C(u, v) = \begin{pmatrix} r\cos u \\ r\sin u \\ hv \end{pmatrix}$ |
| Plane | Face 1 | $P: \mathbb{R} \times \mathbb{R} \to \mathbb{R}^3$ | $P(s, t) = \begin{pmatrix} s \\ t \\ z_0 \end{pmatrix}$ |
| p-curve 1 | Edge 3 | $c_1: \left[\dfrac{\pi}{2}, \dfrac{3\pi}{2}\right] \to \mathbb{R}^2$ | $c_1(w) = \begin{pmatrix} r\cos w \\ r\sin w \end{pmatrix}$ |
| p-curve 2 | | $c_2: [0, 1] \to \mathbb{R}^2$ | $c_2(\sigma) = \begin{pmatrix} \pi\left(\sigma + \dfrac{1}{2}\right) \\ \dfrac{z_0}{h} \end{pmatrix}$ |
| p-curve 3 | Edge 4 | $c_3: \left[-\dfrac{\pi}{2}, \dfrac{\pi}{2}\right] \to \mathbb{R}^2$ | $c_3(\tau) = \begin{pmatrix} r\cos \tau \\ r\sin \tau \end{pmatrix}$ |
| p-vertex 1 | Vertex 8 | v1 | $v_1 = \dfrac{3\pi}{2}$ |
| p-vertex 2 | | v2 | $v2 = 1$ |
| p-vertex 3 | | v3 | $v_3 = \dfrac{\pi}{2}$ |

The coherence of the model is captured by the following properties. Three-dimensional curves defined by $$w \mapsto P \circ c_1(w) = \begin{pmatrix} r\cos w \\ r\sin w \\ z_0 \end{pmatrix}$$

And $$\sigma \mapsto C \circ c_2(\sigma) = \begin{pmatrix} r\cos\left(\pi\left(\sigma + \dfrac{1}{2}\right)\right) \\ r\sin\left(\pi\left(\sigma + \dfrac{1}{2}\right)\right) \\ z_0 \end{pmatrix}$$

represent the same geometrical entity (half circle) corresponding to edge 3. This is how the edge sharing is materialized. Three-dimensional points defined by $P(c_1(v_1))$, $P(c_3(v_3))$ and $C(c_2(v_2))$ represent the same $$\begin{pmatrix} 0 \\ -r \\ z_0 \end{pmatrix}$$

point corresponding to the spatial position of vertex 8. This is how the vertex sharing is materialized.

Other actions (i.e. steps S20-S40) of the example of the method of FIG. 1 are now discussed.

The method aims at determining S40 the first data and the second data and to replace S50 data forming the other function to achieve compression. As explained earlier, the reference function and the other function are geometrically linked by the fact that they correspond to geometrical entities that are a copy one of another. These two functions may be determined in any way.

In the case of the example, the method determines S20 sets of functions corresponding to geometrical entities that are a copy one of another. Then, the compression is performed on a set-by-set basis. Specifically, the method of the example determines S30 a reference function of the set within each set. In other words, for each set, one function of the set is selected, in any way, and afterwards constitutes a function used as reference for the steps of determining S40 and replacing S50. Then, for each set, the method of the example repeats the steps of determining S40 and replacing S50 for each function of the set other than the reference function. The "is a copy of" relation is explained later via an example that constitutes an equivalence relation. The sets of functions determined at S20 may thus constitute a partition of the whole functions. Thus, the method of the example loops the determining S40 and the replacing S50 for each set and within each set for each function other than the reference function determined at S30 for the set. The method of the example thus exhaustively compresses the data of a B-Rep, by exhaustively compressing each set of functions that correspond to copies of geometrical entities for each set.

An example of the determining S20 of sets of functions corresponding to geometrical entities that are a copy one of another is now discussed.

Two geometrical entities (e.g. surfaces or curves) are said to be a copy of each of other if they respect a predetermined (computerized) criterion that marks them as geometrical duplicates. Geometrical entities may form geometrical elements such as faces. It is explained above that a face corresponds to a surface bounded by curves. Thanks to that, the method may be advantageously combined with any pattern recognition method, for examples the method of patent application EP 12306720.9 and/or the method of patent application EP 12306721.7 which are incorporated herein by reference. Indeed, both these patent applications describe a pattern recognition method that is based on sets of geometrical elements (e.g. faces) that are a copy one of another. As more detailed below, the method may perform the determining S20 according to these two patent applications and/or be combined with any of or both the methods of these two patent applications, the determining S20 being efficiently performed only once and used for both the present compression method and the pattern recognition method, thereby achieving a synergetic effect.

One of the aspects of such 3D design under development is known as "pattern recognition". The term "pattern" refers to regular layouts of copies of the same geometric feature. Recognizing patterns allows the handling of such patterns as a single element during the design, thereby widening the array of design possibilities. For example, instead of modifying the elements of a pattern one by one, thanks to a prior recognition of the pattern, the user may perform modifications of the pattern globally e.g. with single actions. Pattern recognition is relevant in different domains of CAD, such as mechanical design, consumer goods, building architecture, aerospace, or other domains. Pattern recognition may be related to feature recognition. Feature recognition is useful to recognize characteristic shapes on a given 3D object (typically a solid representing a mechanical part). Characteristic shapes of interest for mechanical design include for example holes, extruded pads, extruded pockets, fillets or rounds, revolute pads, and/or revolute pockets. Recognizing a characteristic shape amounts to identify its specifications through a better semantic level, for example the profile of an extruded or revolute shape, the revolution axis of a revolute shape, the radius value of rounds and fillets, an extrusion direction, and/or an extrusion depth. This information is used either to modify the shape, for example by editing the profile of the extrusion, or to feed a downstream process, machining process for example.

Patent application EP 12306720.9 and/or patent application EP 12306721.7 both describe methods to perform pattern recognition, comprising a step of determining a set of faces that are a copy one of another. The determining S20 may include such determination of such a set of faces, and potentially a repetition of such action. Afterwards, for each set of faces that are a copy one of another thus determined, the determining S20 may simply comprise gathering geometrical entities of the faces that topologically correspond to each other in as many sets in any way, thereby obtaining sets of functions corresponding to geometrical entities that are a copy one of another. In other words, as explained later, the faces are determined to be copies one of another according to a rigid motion. The rigid motion transforms each of the entities of one face (e.g. surface and/or boundary curves) into one, and only one, corresponding entity of the other face.

The determining S20 of the example thus comprises determining a set of faces that are copies one of each other, or, in other words, geometrically identical one to each other, or geometric replicas one of the other. The set may be determined at S20 according to any implementation desired by the skilled person. For example, the method may comprise performing comparisons between pairs of faces, the faces being browsed according to any order. Such comparisons may be performed in any way. Examples are provided later. Also, as known from the field of CAD, any determination involving numerical computations is subject to the necessary numerical approximations applied by the system. In the present case, faces may be determined at S20 to be a copy of each other although they are in theory slightly different. Thus, the method may actually determine at S20 a set of faces that are substantially a copy one of another. However, the way the approximations are implemented is not the subject of the present discussion, such that "substantially a copy one of another" and "a copy one of another" are not distinguished in the following. It is indeed only considered that the method follows a predetermined criterion for telling if two faces are a copy one of another.

A face may be seen as a point-set (and thereby handled as such by the method), i.e. a subset of the three-dimensional space $\mathbb{R}^3$. A rigid motion is a mapping $D:\mathbb{R}^3 \rightarrow \mathbb{R}^3$ defined between two point-sets by $D(x)=Rx+T$ where $R$ is a rotation and $T$ is a translation vector (possibly null). A rigid motion is invertible since $y=D(x)$ is equivalent to $x=D^{-1}(y)$ where $D^{-1}(y)=R^{-1}y-R^{-1}T$. As the faces of the set are a copy one of another, given two faces of the set, one may be derived from the other one by applying a rigid motion.

Given a point-set X, a point-set Y is a "replica" of X if there exists a rigid motion D such that $Y=\{D(x), x \in X\}$, which is noted $Y=D(X)$ in short.

An "oriented point-set" is a couple $(X, u_X)$ where $X \subset \mathbb{R}^3$ is a point-set and $u_X$ is a mapping $u_X:X \rightarrow S^2$ where $S^2$ is the set of unit vectors of $\mathbb{R}^3$. In other words, at any point $x \in X$, a unit vector $u_X(x)$ is defined.

An oriented point-set $(Y, u_Y)$ is a "copy" of an oriented point-set $(X, u_X)$ if Y is a replica of X that saves the orientation. More precisely, for all $x \in X$, the unit vector of the corresponding point $D(x)$ on the replica is the rotated unit vector of X at point x. Formally, for all $x \in X$, $u_Y(D(x))=Ru_X(x)$, meaning that the following diagram is commutative.

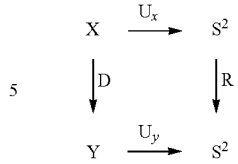

The relation "is a copy" on point-sets, on which the determining S20 relies, is an equivalence relation. To prove that, it is enough to check the following properties, which is not difficult: (1) a point-set is a copy of itself, (2) if Y is a copy of X then X is a copy of Y and (3) if Y is a copy of X and Z is a copy of Y, then Z is a copy of X.

According to basic algebra, given a finite set G of point-sets (meaning that elements of G are point-sets) the equivalence relation "is a copy" separates G into disjoint and maximal sets $G_i$ of copies. This means that $G_i \cap G_j = \emptyset$ if $i \neq j$, that $G = \cup_i G_i$, that if $X, Y \in G_i$ then Y is a copy of X and that if $X \in G_i$ and $Y \notin G_i$ then Y is not a copy of X. The sets $G_i$ are in fact "classes" of point-sets by reference to the equivalence classes of an equivalence relation.

The previous theory applies (but is not restricted) to the faces of a solid (i.e. the modeled object in the example is a solid). Faces play the role of point-sets and the solid's B-Rep is the set G. In other words, to implement the determining S20, the skilled person may represent the faces as point-sets and the B-Rep provided at S10 as a set G as defined above.

An example of determining sets of copy faces in the determining S20 is now discussed.

Given a modeled object e.g. that represents a solid, the B-Rep of said solid provided at S10 is considered as a set of independent faces. Meaning that $G=\{f_1, \ldots, f_n\}$ where $f_i$ is the i-th face of the solid. The very first step is to compute (i.e. the determining S20) sets of G according to the "is a copy" relation. The overall algorithm is as follows.

```
For i := 1 to n do begin
    If f_i is not already used in a set then
        Create a new set G_i := {f_i}
        For j := i + 1 to n do begin
            If f_j is not already used in a set then
                If f_j is a copy of f_i then
                    G_i := G_i ∪ {f_j}
                    Store the rigid motion that changes f_i
                    into f_j
                End if
            End if
        End for
    End if
End for
```

As can be seen, all sets of copies are thus determined at the beginning, with possible modifications of the determined sets as explained later.

An example of how to implement the "is a copy" relation for faces is now discussed.

As explained earlier, a face of a solid is defined by a supporting surface (e.g. a plane) and by boundary edges. In an example, the face is equipped with the outer normal vector of the solid. The boundary edges are oriented according to this normal vector. Boundary edges are connected by sharing vertices.

In order to perform comparisons and to find the rigid motions, each face is equipped with several axis systems. At each vertex v of the face, an axis system is created as follows. The coordinates of the origin point P are the coordinates of the vertex v. First vector, noted U, is tangent to the input boundary edge of v and such that −U is oriented like the boundary edge. Second vector, noted V, is tangent to the output boundary edge of v and is oriented in the boundary edge direction. Words "input" and "output" are related to the topological orientation of the boundary edges according to the normal vector of the face. The third vector is the outer normal vector N of the face computed at vertex v. Despite N is always perpendicular to U and to V, it should be noticed that the axis system (P, U, V, N) is not generally direct and orthogonal.

Figure 9:
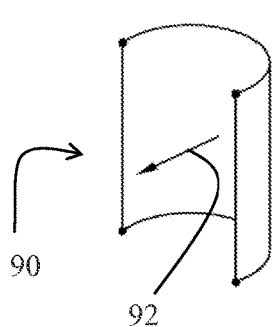
Figure 10:
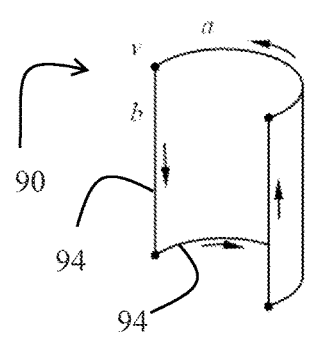
Figure 11:
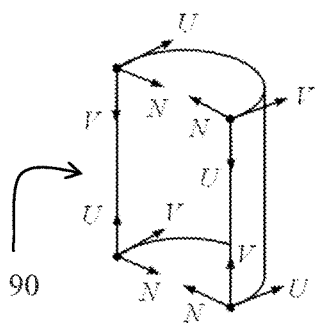

FIGS. 9-11 illustrate the axis systems of a semi-cylindrical face 90. FIG. 9 shows face 90 and its normal vector 92. FIG. 10 shows the topological orientation of boundary edges 94 induced by normal vector 92. Boundary edge a is an input edge of vertex v. Boundary edge b is an output edge of vertex v. FIG. 11 displays vectors U, V, N of axis systems at each boundary vertex.

Now, the method may, in an example, within the determining S20, determine if two faces are copies one of another by searching the rigid motion between them, if any. Let f, g be two faces respectively equipped with (the same number of) local axis systems $S_1^f, \ldots, S_m^f$ and $S_1^g, \ldots, S_m^g$. If faces f, g do not have the same number of local axis systems, it means that they do not have the same number of boundary vertices, so they are determined not to be copies of each other and the rigid motion search is not launched. The method may test such conditions.

The first step is to compute the rigid motions $D_{i,j}$ respectively changing the i-th axis system of face f into the j-th axis system of face g. Since i, j=1, ..., m, there exists at most $m^2$ such rigid motions. Formally, rigid motions are such that $D_{i,j}(s_i^f) = S_j^g$. Noting $S_i^f = (P_i^f, U_i^f, V_i^f, N_i^f)$, $S_j^g = (p_j^g, U_j^g, V_j^g, N_j^g)$ and $D_{i,j}(x) = R_{i,j}x + T_{i,j}$ this is achieved by first solving the following linear system, keeping in mind that the unknowns are the coefficients of matrix $R_{i,j}$ and coordinates of vector $T_{i,j}$.

$$R_{i,j}U_i^f = U_j^g$$

$$R_{i,j}V_i^f = V_j^g$$

$$R_{i,j}N_i^f = N_j^g$$

$$T_{i,j} - R_{i,j}P_i^f = P_j^g$$

Secondly, to insure that matrix $R_{i,j}$ is a rotation, the two following conditions must be checked.

$$R_{i,j}R_{i,j}^T = 1$$

$$\det(R_{i,j}) = 1$$

Otherwise, $D_{i,j}$ is not a rigid motion because $R_{i,j}$ is not a rotation.

Then, the rigid motion D* that changes f into g, if any, is to be found among the previously computed $D_{i,j}$. The problem is now to answer the question: given f, g and a rigid motion D, is D(f)=g true? This may be done by sampling face f with a collection of 3D points $x_k$, k=1, ..., q and by checking that the distances between points $D(x_k)$ and face g are small enough compared to a predetermined numerical threshold for identical objects. If, among the $D_{i,j}$, several rigid motions can change f into g, then a pure translation is selected when possible. This is an efficient way of performing the determining S20, leading to results compliant with user intent.

An example of the data structure for the sets determined at S20 according to the iteration of the above-discussed example is now discussed.

The rigid motions and related point-sets may be stored in an appropriate data structure, now discussed, in order to retrieve copies of a given point-set (corresponding to a given face) and the associated rigid motions. Conceptually, this data structure includes a directed graph W=(P,A,α,ω) where nodes P are point-sets and arcs A are labeled with rigid motions. The labeling is a mapping m:A→SE(3) where SE(3) is the group of three-dimensional rigid motions. More precisely, writing that arc u∈A starts at node α(u)=x∈P and ends at node ω(u)=y∈P means that point-sets x and y are copies of each other and that the rigid motion m(u) changes x into y, which is noted: y=m(u)x. Now, suppose that arc v∈A connects x et z∈P, which is written α(v)=x and ω(v)=z. The rigid motion that changes x into z is z=m(v)x. Then, z is also a copy of y and the rigid motion that changes y into z is $z=m(v)m(u)^{-1}y$. Conversely, the rigid motion that changes z into y is $y=m(u)m(v)^{-1}z$. This information may be all captured by the data structure.

By nature, the algorithm computing initial subsets creates a graph made of depth-1 tree graphs, each of them being a subset. By definition, a depth-1 tree is a tree graph featuring one node with no input arc (the root node) and all other nodes with no output arc nodes (leaf nodes). In other words, all non-root nodes are connected to the root node. Consequently, given any two nodes within a depth-1 tree graph, there exists only one path of arcs joining them, and this unique path includes only two arcs.

Figure 12:
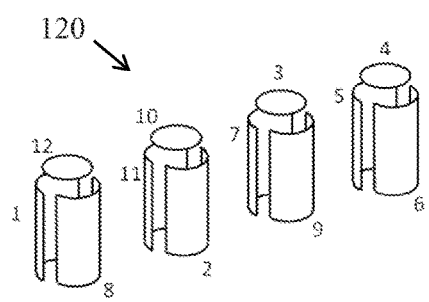
Figure 13:
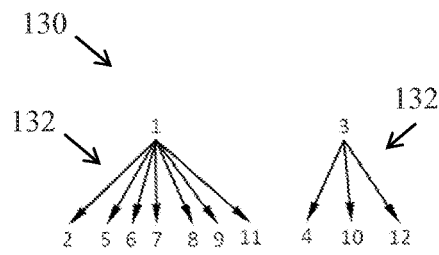

FIGS. 12-13 illustrate the graph data structure resulting from the algorithm computing initial sets of copied faces. FIG. 12 illustrates a B-Rep 120 of a modeled object consisting of four aligned cylindrical slots, with faces numbered from 1 to 12. They are numbered according to some arbitrary storage in the topological data structure. FIG. 13 illustrates the graph 130, including two depth-1 trees 132.

Accordingly, the rigid motion that changes one point-set into any other point-set is computed by combining rigid motions along the path of arcs joining the two said point-sets. Since this path includes two arcs, only two rigid motions are combined. This facility of computing the rigid motion relating to any two point-sets within a subset is widely used in this example of the method.

Determining S40 the first data and the second data is now discussed.

The reference function and the other function may be functions of any type, such as NURBS, or other kinds of functions previously discussed, and may thus involve a high amount of data. The method determines first data and second data, which, together with the pointer, generally form smaller data than the compressed "other" functions.

In the method, the term "mapping" refers to a specific kind of function that generally involves relatively little data compared to the functions. Specifically, the term "mapping" may refer to canonical functions (i.e. functions expressed with a simple canonical formulas). For example, the mappings of the method may be affine mappings, such as rigid motions between pairs of 3D spaces (i.e. range) or between a 3D space and itself, and/or 2D local maps between pairs of 2D spaces (i.e. domains) or between a 2D space and itself. In any case, the mappings may have a predetermined form, e.g. known to the ulterior method of decompression. This way, the first data and the second data may only comprise the parameters of the mappings (excluding any information as to the nature of the mapping). This way, the data used in the replacing S50 is as small as possible.

Now, the method determines at S40 data that describe mappings. This means that the first data and/or the second data may comprise formulations of the mappings under consideration themselves, values of the parameters of the mappings only as explained above (e.g. in the case the mappings are predetermined to be affine mappings), or ways to indirectly describe said mappings for example by formulations or values or parameters of the inverses of the mappings. Furthermore, it is noted that, when the method is iterated for sets of copies of geometrical entities and within each such set, the mappings may happen to be related one to each other for different iterations of the determining S40. This is the case for example when copies of faces comprising a supporting surface and boundary curves are considered. In such a case, the mapping between domains of functions corresponding to the copies of surfaces (e.g. surface definitions) may be the same or the inverse of the mappings between ranges of functions corresponding to copies of boundary curves (e.g. p-curves). In such a case, the first data and/or the second data may advantageously comprise a pointer to first data and/or second data previously determined (e.g. in a previous iteration of the determining S40), and a piece of information on the nature of the relation between the two mappings, at least at one iteration of the determining S40. This allows further compression, with a "re-use" of mappings at different iterations of the determining S40 and replacing S50.

The functions may comprise parametric functions. In such a case, the mapping from the range of the reference function to the range of the other function (i.e. the mapping described by the first data), and the mapping from the domain of the other function to the domain of the reference function (i.e. the mapping described by the second data) are affine mappings. This means that these mappings are functions formulated as a linear expression of one or several parameters. This allows a high rate of compression, as affine mappings may be expressed simply.

Specifically, the functions may comprise surface definitions (i.e. functions that correspond to a surface). In such a case, when the reference function and the other function considered are such surface definitions that correspond to surfaces that are a copy one of another, the mapping from the range of the reference function to the range of the other function is a rigid motion that transforms the surface corresponding to the reference function into the surface corresponding to the other function. Such rigid motion may be advantageously pre-determined when partitioning the faces into sets of copy faces, as explained above. The method may thus be performed fast. The mapping from the domain of the other function to the domain of the reference function is a 2D local map, as explained later.

Moreover, the functions may comprise p-curves (i.e. functions that correspond to a curve, and are provided as a function of one parameter with an image inside the 2D domain of a surface definition). In such a case, when the reference function and the other function considered are such p-curves that correspond to curves that are a copy one of another, the mapping from the range of the reference function to the range of the other function is a 2D local map from the range of the reference function to the range of the other function, and the mapping from the domain of the other function to the domain of the reference function is a 1D local map. Said 2D local map is the inverse of a 2D local map from the range of the other function to the range of the reference function, which may have been previously determined at iterations where the functions (reference function and other functions) were the surface definitions to which the p-curves of the current iteration are related. This is explained later. This speeds up the method and increases compression, as previously determined information may be re-used. Indeed, the first data of the current iteration may simply refer to the second data of the previous iteration in question, by specifying that said inverse of the 2D local map is contemplated.

As explained earlier, the functions may define faces that are a copy one of the other. Each face may be defined by one reference surface definition, at least one other surface definition, a reference set of at least one p-curve having a range included in the domain of the reference surface definition and another set of at least one p-curve having a range in the domain of the other surface definition and corresponding to a respective one of the reference set (i.e. each "other" p-curve corresponds to a boundary curve of a face that is a copy of the "reference" face, i.e. the one defined by the reference surface definition and p-curves, said boundary curve being a copy of a respective boundary curve of the reference face).

In such a case, the replacing S50 includes replacing the other surface definition and the other set (of p-curves), by first and second data determined by several iterations of S40 as explained earlier and that all form data describing different elements. These elements include a pointer to the reference surface definition. These elements also include, for each one of the other set (of p-curves), a pointer to the corresponding one (a reference p-curve) of the reference set. These elements also include a rigid motion that transforms the surface corresponding to the reference surface definition into the surface corresponding to the other surface definition, a 2D local map between the domain of the other surface definition to the domain of the reference surface definition, and a 1D local map between the domain of each one of the other set to the domain of the corresponding one of the reference set. In such a case, the method is particularly efficient in terms of compression ratio.

A definition of 2D local map that may be used by the method is now discussed.

Let $P: A \to \mathbb{R}^3$, $(u,v) \mapsto P(u,v)$ and $Q: B \to \mathbb{R}^3$, $(s,t) \mapsto Q(s,t)$ be two three-dimensional parameterized surfaces (i.e. parametric surface definitions). Domains A and B are (subsets of) $\mathbb{R}^2$. By definition, ranges of surfaces P and Q are the following subset of $\mathbb{R}^3$:

$$R(P)=\{P(u,v); (u,v) \in A\}$$

and $$R(Q)=\{Q(s,t); (s,t) \in B\}$$

Saying that surface Q is duplicated from (i.e. a copy of) surface P means that there exists a rigid motion $D \in SE(\mathbb{R}^3)$ (that may be determined when partitioning the faces as explained earlier) such that moving the range of surface P makes it identical to surface Q:

$$D(R(P))=R(Q)$$

In other words, this means that for all $(u,v) \in A$, there exists $(s,t) \in B$ such that:

$$D(P(u,v))=Q(s,t)$$

and vice versa. Previous equation implicitly defines a correspondence between parameters domains A and B. The goal of a 2D local map is to make this correspondence explicit. By definition, the 2D local map associated with surfaces P and Q together with rigid motion D is a mapping $q: B \to A$ such that for all $(s,t) \in B$ $$D(P(q(s,t)))=Q(s,t)$$

This can be written equivalently $$D \circ P \circ q = Q$$

It may be useful to deal with coordinates of map q as well as its inverse map. So, the following notation may be useful.

$$q(s,t) = (f(s,t), g(s,t))$$

and $$q^{-1}(u,v) = (f^*(u,v), g^*(u,v))$$

A definition of 1D local map that may be used by the method is now discussed.

In addition to previous geometrical objects, a p-curve $\lambda \in I \mapsto (\tilde{u}(\lambda), \tilde{v}(\lambda)) \in A$ is defined on surface P and a p-curve $\mu \in J \mapsto (\tilde{s}(\mu), \tilde{t}(\mu)) \in B$ is defined on surface Q. Domains I and J are (intervals of) $\mathbb{R}$. By definition, ranges of these p-curves are respectively the following subsets of $\mathbb{R}^3$:

$$R(\tilde{u},\tilde{v}) = \{P(\tilde{u}(\lambda), \tilde{v}(\lambda)); \lambda \in I\}$$

and $$R(\tilde{s},\tilde{t}) = \{Q(\tilde{s}(\mu), \tilde{t}(\mu)); \mu \in I\}$$

Suppose that the rigid motion D changes the range of the p-curve $(\tilde{u},\tilde{v})$ into the range of the p-curve $(\tilde{s},\tilde{t})$, that is $$D(R(\tilde{u},\tilde{v})) = R(\tilde{s},\tilde{t})$$

meaning that for all $\mu \in J$, there exists $\lambda \in I$ such that $$D(P(\tilde{u}(\lambda), \tilde{v}(\lambda))) = Q(\tilde{s}(\mu), \tilde{t}(\mu))$$

This implicitly defines a correspondence between domains I and J. Here again, a 1D local map is to make this correspondence explicit. By definition, the 1D local map associated with surfaces P, Q, with p-curves $(\tilde{u},\tilde{v})$, $(\tilde{s},\tilde{t})$ and with rigid motion D is a map $r: J \to I$ such that for all $\mu \in J$ $$D(P(\tilde{u}(r(\mu)), \tilde{v}(r(\mu)))) = Q(\tilde{s}(\mu), \tilde{t}(\mu))$$

But, thanks to local map q, $D(P(q(s,t))) = Q(s,t)$ for all $(s,t) \in B$ so, for all $\mu \in J$ $$D(P(q(\tilde{s}(\mu), \tilde{t}(\mu)))) = Q(\tilde{s}(\mu), \tilde{t}(\mu))$$

and then $$D(P(\tilde{u}(r(\mu)), \tilde{v}(r(\mu)))) = D(P(q(\tilde{s}(\mu), \tilde{t}(\mu))))$$

Since rigid motion D is invertible and since surface P is injective this implies:

$$(\tilde{u}(r(\mu)), \tilde{v}(r(\mu))) = q(\tilde{s}(\mu), \tilde{t}(\mu))$$

And, finally, by using the inverse 2D local map $q^{-1}$ $$(\tilde{s}(\mu), \tilde{t}(\mu)) = q^{-1}(\tilde{u}(r(\mu)), \tilde{v}(r(\mu)))$$

Which can be written equivalently $$\tilde{s}(\mu) = f^*(\tilde{u}(r(\mu)), \tilde{v}(r(\mu)))$$

$$\tilde{t}(\mu) = g^*(\tilde{u}(r(\mu)), \tilde{v}(r(\mu)))$$

or $$\begin{pmatrix} \tilde{s} \\ \tilde{t} \end{pmatrix} = q^{-1} \circ \begin{pmatrix} \tilde{u} \\ \tilde{v} \end{pmatrix} \circ r$$

This relation is a key feature of this example of the method because it links p-curve on surface Q with p-curve on surface P combined with local maps.

For the sake of completeness, a definition of a 0D local map is also discussed, although not involved in the examples of compression provided.

In addition to previous geometrical objects, a p-vertex $\lambda_0$ is defined on the p-curve $\lambda \mapsto (\tilde{u}, \tilde{v}(\lambda))$ and a p-vertex $\mu_0$ is defined on the p-curve $\mu \mapsto (\tilde{s}(\mu), \tilde{t}(\mu))$. The ranges of these p-vertices are their 3D coordinates, respectively $S(\tilde{u}(\lambda_0), \tilde{v}(\lambda_0))$ and $Q(\tilde{s}(\mu_0), \tilde{t}(\mu_0))$. Furthermore, the rigid motion D changes (the range of) p-vertex $\lambda_0$ into (the range of) p-vertex $\mu_0$ meaning that:

$$D(P(\tilde{u}(\lambda_0), \tilde{v}(\lambda_0))) = Q(\tilde{s}(\mu_0), \tilde{t}(\mu_0))$$

The 0D local map is the value $r(\mu_0)$ where $r(\cdot)$ is the 1D local map of the p-curves. Then, since $\lambda_0 = r(\mu_0)$, it is possible to compute the p-vertex $\lambda_0$ defined on p-curve $(\tilde{u}, \tilde{v})$ by using the p-vertex $\mu_0$ defined on p-curve $(\tilde{s}, \tilde{t})$ and the appropriate 1D local map.

An example of a 2D local map and its determination is now provided.

Figure 14:
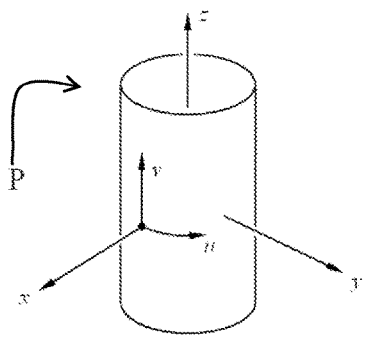

Let surface P be the z-axis cylinder parameterized by $$P(u,v) = \begin{pmatrix} a \cos u \\ a \sin u \\ bv \end{pmatrix}$$

and illustrated on FIG. 14.

Figure 15:
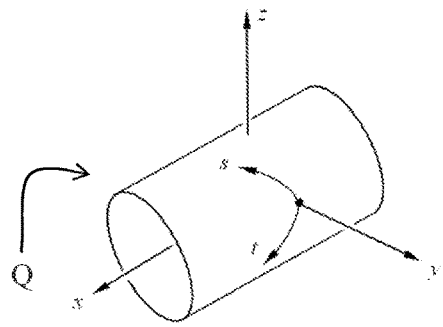

And let surface Q be the x-axis cylinder illustrated on FIG. 15 and parameterized by:

$$Q(s,t) = \begin{pmatrix} c(s+t) \\ a \cos(s-t) \\ a \sin(s-t) \end{pmatrix}$$

Clearly, moving the range of surface P according to a $$\frac{\pi}{2}$$

rotation around y axis makes it coincident with the range of surface Q. The matrix of said rotation is:

$$D = \begin{pmatrix} 0 & 0 & 1 \\ 0 & 1 & 0 \\ -1 & 0 & 0 \end{pmatrix}$$

Then, straightforward computation starting with the definition $$\begin{pmatrix} 0 & 0 & 1 \\ 0 & 1 & 0 \\ -1 & 0 & 0 \end{pmatrix} \begin{pmatrix} a \cos(f(s,t)) \\ a \sin(f(s,t)) \\ bg(s,t) \end{pmatrix} = \begin{pmatrix} c(s+t) \\ a \cos(s-t) \\ a \sin(s-t) \end{pmatrix}$$

yields the following 2D local map.

$$f(s,t) = s - t - \frac{3\pi}{2}$$

$$g(s,t) = \frac{c}{b}(s+t)$$

It is such that, for all $(s,t): D(P(f(s,t), g(s,t))) = Q(s,t)$.

And the inverse 2D local map is:

$$f^*(u, v) = \frac{1}{2}\left(u + \frac{b}{c}v + \frac{3\pi}{2}\right)$$

$$g^*(u, v) = \frac{1}{2}\left(\frac{b}{c}v - u - \frac{3\pi}{2}\right)$$

It is such that, for all (u,v)

$$D(P(u,v)) = Q(f^*(u,v), g^*(u,v))$$

An example of a 1D local map and its determination is now provided.

The p-curve $$\tilde{u}(\lambda) = \lambda$$

$$\tilde{v}(\lambda) = v_0$$

Figure 16:
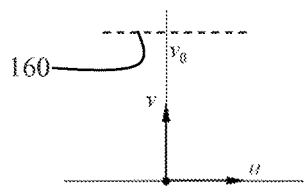

(dotted line 160 on FIG. 16) on surface P defines in $\mathbb{R}^3$ the curve parameterized by:

$$\lambda \mapsto P(\lambda, v_0) = \begin{pmatrix} a\cos\lambda \\ a\sin\lambda \\ bv_0 \end{pmatrix}$$

Figure 17:
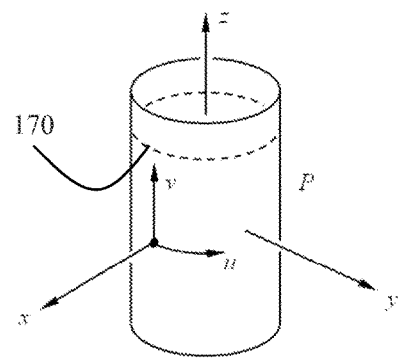

This curve is a circle centered at $(0,0,bv_0)$ with radius a and perpendicular to z-axis (dotted line 170 on FIG. 17).

The p-curve:

$$\tilde{s}(\mu) = \mu$$

$$\tilde{t}(\mu) = v_0\frac{b}{c} - \mu$$

Figure 18:
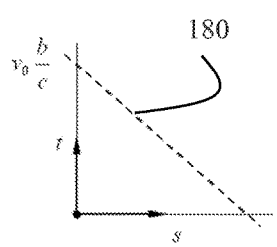
Figure 19:
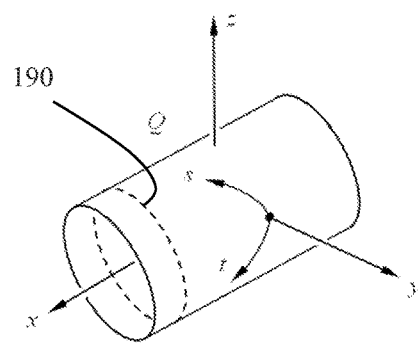
Figure 20:
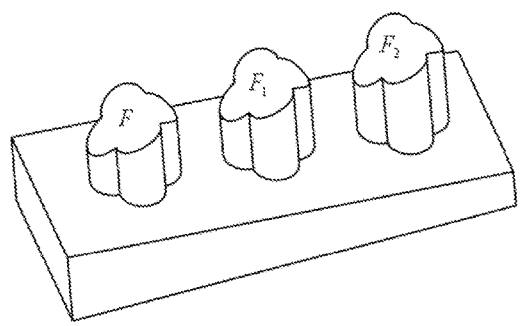
Figure 21:
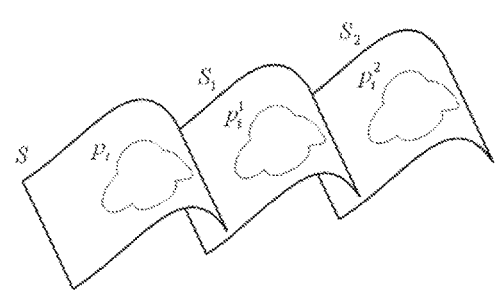

(dotted line 180 on FIG. 18) on surface Q defines a circle centered at $(bv_0,0,0)$ with radius a and perpendicular to x-axis (dotted line 190 on FIG. 19). It is parameterized by:

$$\mu \mapsto Q\left(\mu, v_0\frac{b}{c} - \mu\right) = \begin{pmatrix} bv_0 \\ a\cos\left(2\mu - \frac{b}{c}v_0\right) \\ a\sin\left(2\mu - \frac{b}{c}v_0\right) \end{pmatrix}$$

Moving the circle on surface P according to rigid motion D yields (from the ranges point of view) the circle on surface Q. The 1D local map $\mu \mapsto r(\mu)$ can be computed according to the definition by starting with:

$$\begin{pmatrix} 0 & 0 & 1 \\ 0 & 1 & 0 \\ -1 & 0 & 0 \end{pmatrix} \begin{pmatrix} a\cos r \\ a\sin r \\ bv_0 \end{pmatrix} = \begin{pmatrix} bv_0 \\ a\cos\left(2\mu - \frac{b}{c}v_0\right) \\ a\sin\left(2\mu - \frac{b}{c}v_0\right) \end{pmatrix}$$

Which yields the following 1D local map.

$$r(\mu) = 2\mu - \frac{b}{c}v_0 - \frac{3\pi}{2}$$

It is such that, for all μ:

$$D(P(r(\mu), v_0)) = Q\left(\mu, v_0\frac{b}{c} - \mu\right)$$

An example illustrating how compression may be performed with the method is now discussed.

In the example, the input data is the B-Rep of a solid model. The first step is to recognize on the B-Rep all duplicated surfaces and p-curves. This may be performed by recognizing copy faces as discussed earlier. The algorithm described earlier recognizes duplicated faces by identifying duplicated support surfaces and duplicated boundary edges. From this information, the method may easily outputs a graph G of duplicated surfaces and a graph H of duplicated p-curves. Nodes of the graph G (resp. graph H) are surfaces (resp. p-curves) and arcs of the graph are labeled with rigid motions. Each connected component of graph G (resp. H) is a group of surfaces (resp. p-curves) that are replications of the same common reference. In each connected component, the method of the example arbitrarily selects one node that is the reference node.

It may be noticed that, in order to find the appropriate rigid motion D that changes the range of a surface $(u,v) \mapsto (u,v)$ into the range of a surface $(s,t) \mapsto Q(s,t)$, the algorithm discussed earlier and that may also be used here performs several projections of points of one surface onto the other one. In particular, this yields several couples of parameters $(u_i, v_i)$ and $(s_i, t_i)$ such that $D(P(u_i, v_i)) = Q(s_i, t_i)$. They may be advantageously reused in the following.

The second step in the example is to compute local maps. The example deals with affine local maps only. This is advantageous because an affine local map requires small computing time and small storing space. Furthermore, industrial experience shows that non affine local maps seem unnecessary when modeling mechanical parts with solids. A 2D affine local map is computed each time a non reference surface Q ("other" surface) is duplicated from a reference surface P. The 2D affine local map can be written:

$$q(s, t) = \begin{pmatrix} q_1 & q_2 \\ q_3 & q_4 \end{pmatrix}\begin{pmatrix} s \\ t \end{pmatrix} + \begin{pmatrix} q_5 \\ q_6 \end{pmatrix}$$

so that six coefficients $q_i$, i=1, . . . , 6 must be identified. This can be done advantageously by collecting, for j=1, 2, 3, $$q(s_j, t_j) = \begin{pmatrix} u_i \\ v_j \end{pmatrix}$$

from first recognition step. This yields 3×2=6 linear equations for $q_i$, i=1, . . . , 6 unknowns, which is solved by using standard linear algebra. Some extra validation may be performed to ensure that this (candidate) affine local map is efficient on the whole surface. This is detailed later, regarding affine local map validation.

Each time a non reference p-curve is duplicated from a reference p-Curve, a 1D affine local map is computed. It is defined by:

$$r(\mu) = r_1\mu + r_0$$

Unknown coefficients $r_i$, i=1, 2 are obtained by collecting, for j=1, 2

$$r(\mu_j) = \lambda_j$$

from first recognition step. This yields two linear equations for $r_i$, i=1, 2 unknowns, which is solved by using standard linear algebra.

The final step is the compression itself. Compression replaces non reference geometries by local maps, rigid motions and pointers to reference geometries. More precisely, a non reference surface Q is replaced by the following triple:
- a pointer to a reference surface P
- the rigid motion D and
- the 2D affine local map q.

A non reference p-curve $(\tilde{s},\tilde{t})$ defined on a non reference surface Q (the reference surface of which is P) is replaced by the following triple:
- a pointer to the reference p-curve $(\tilde{u},\tilde{v})$ defined on reference surface P
- the 2D affine local map q
- the 1D affine local map r.

The uncompressing is performed as follows. A mathematical definition of a non reference surface Q is restored by retrieving its reference surface P, the associated rigid motion D and the 2D local map q according to the following formula:

$$Q := D \circ P \circ q$$

A mathematical definition of a non reference p-curve $(\tilde{s},\tilde{t})$ is restored by retrieving local maps q and r and the reference p-curve $(\tilde{u},\tilde{v})$ according to the following formula (where the inverse $q^{-1}$ of q may easily be computed on the fly):

$$\begin{pmatrix}\tilde{s}\\\tilde{t}\end{pmatrix} := q^{-1} \circ \begin{pmatrix}\tilde{u}\\\tilde{v}\end{pmatrix} \circ r$$

Clearly, only straightforward evaluations are needed, which makes the uncompressing fast and safe.

The determining S40 of the examples may further comprise an affine local map validation. This is discussed below.

Computing the 2D affine local map q such that:

$$D(P(q(s_i,t_i))) = Q(s_i,t_i)$$

for i=1, 2, 3 does not necessarily yield, for all (s,t):

$$D(P(q(s,t))) - Q(s,t) = 0$$

Extra checking is advantageous. The principle is to check the previous relationship for a number of points $(s_i,t_i)$ that is large enough, depending on the degree of surfaces P and Q. When surfaces P and Q are planar or B-Spline, the following function is a polynomial.

$$f(s,t) = D(P(q(s,t))) - Q(s,t)$$

When P or Q is a NURBS surface (which includes canonical surfaces as well as free form surfaces), function $f(s,t)$ is a rational function, but basic algebraic manipulation can change it into a polynomial function. Anyway, the point is to check whether the polynomial function $f(s,t)$ vanishes for all (s,t). It can be written:

$$f(s,t) = \sum_{j=0}^{d_t} g_j(s) t^j$$

where $g_j$ are polynomials. Checking that $f(s_1,t)=0$ for $d_t+1$ values of t implies that $g_j(s_1)=0$ for $j=0, \ldots, d_t$. Repeating this process $d_s+1$ times, where $d_s$ is the largest degree of polynomials $g_j$, insures that $g_j(s)=0$ for $j=0, \ldots, d_t$ and for all s. This means that function $f$ is the zero function, so that affine local map q is valid for all (s,t). Notice that polynomial function $f$ does not need to be explicit, only its degree is relevant, which can be obtained by considering the degrees of surfaces P and Q.

If the validation fails, then surface Q is not compressed.

Existing compression techniques deal with low level semantic of the data: mesh triangles, data structure (pointers, arrays) and geometrical coordinates. So, when the solid model is made of precise geometry, mesh based compression technology is inoperative. Furthermore, when the solid model involves many occurrences of identical shapes, each occurrence is compressed independently, thus missing an enormous potential of data reduction.

On the contrary, the described methods take advantage of repeated features that very often occur on the shape of a mechanical part. In a first step, the method recognizes all similar geometries. Geometries taken into account are surfaces and p-curves, which are widely used in a B-Rep model. This recognition step yields spatial positions of copies as well as local maps. A local map bridges the parameter domain of two duplicated geometries. Then, the method creates the dictionary of repeated geometries, consisting, for each replicated geometry, in a pointer to the reference geometry together with a rigid motion and local maps. The compressed version of the input B-rep only includes the compressed geometry, topological data is unchanged.

A first advantage of the methods of the examples is that compressing geometry considerably reduces the amount of B-Rep data. Indeed, industrial experimentation performed at Dassault Systèmes on a representative database of mechanical CAD models shows that 74% of the memory is held by geometry as opposed to 25% held by topology. Thus, compressing geometry saves memory for data storing and speeds up data transmission in a network environment.

A second advantage is that existing compression techniques can be used to compress the B-Rep model resulting from the methods described here. In other words, the invention can be used as a preprocessor to existing compression techniques.

A third advantage is that the uncompressing method does not perform any numerical computation. Uncompressing restores the original format of surfaces and p-curves by combining reference surfaces and p-curves with rigid motions and local maps. Without local maps, parameterization of uncompressed non reference geometries would change, making numerical projection or intersection unavoidable, which is potentially unsafe.

Results provided by the method are now discussed.

From the memory size point of view a rigid motion is defined by an axis vector, an angle value and a translation vector so that the memory size for storing a rigid motion is seven real numbers. A 2D local map is defined by six real numbers and a 1D local is defined by two real numbers. Compression ratio depends on the nature of the geometry. NURBS geometry can be arbitrary large (in terms of memory size) so the compression ratio can be arbitrary large as well since the said geometry is replaced by constant size data. Canonical geometries (plane, cylinder, cone, sphere, torus) can be compressed as well despite they have a constant size. The applicant's experience in terms of compression ratio is the following:

| Plane | Cylinder | Cone | Sphere | Torus |
|-------|----------|------|--------|-------|
| 1.5   | 1.67     | 1.67 | 1.67   | 1.83  |

A throughout example of the compression according to the method is now discussed with reference to FIGS. 20-27.

The B-Rep model of the example includes a face F defined on a surface S and bounded by n p-curves $p_i$, i=1, . . . , n. It includes also m copies $F_j$, j=1, . . . , m of face F positioned at separate locations in space, as illustrated on FIG. 20 with n=4 and m=2.

Surfaces of copied faces are noted $S_j$, j=1, . . . , m, p-curves bounding face $F_j$ are noted $p_i^j$, i=1, . . . , n and they point to their supporting surface.

Figures 22, 23, 24:
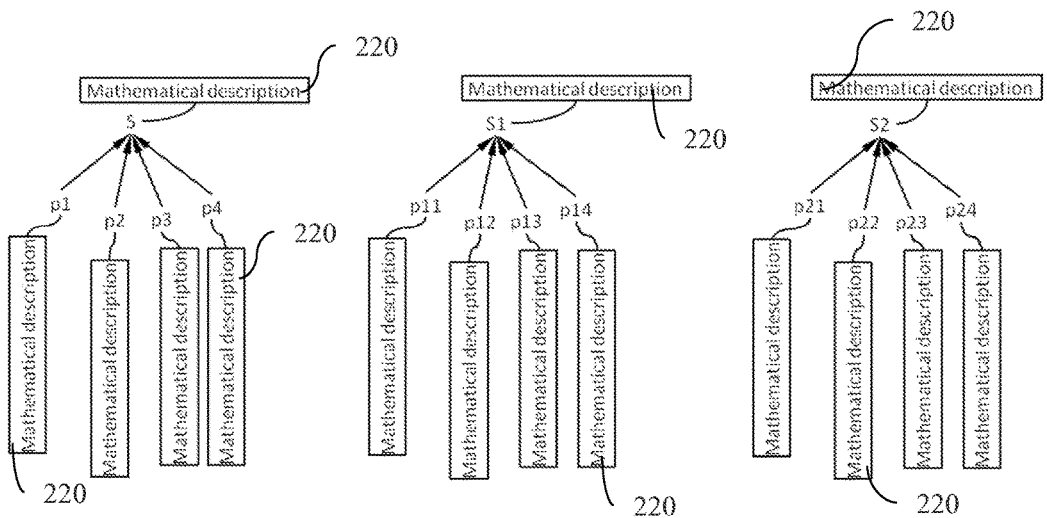
Figures 25, 26, 27:
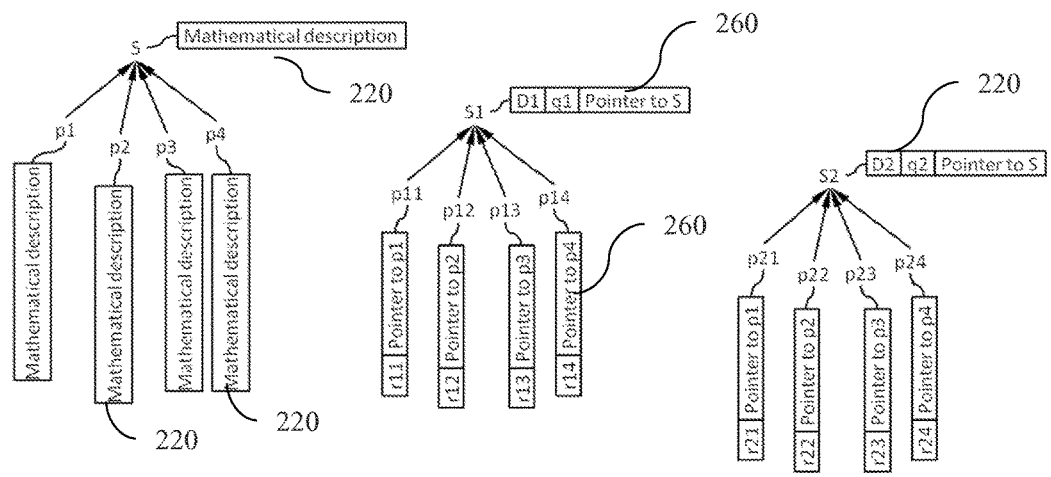

Each geometrical element is equipped with its own mathematical description 220, as illustrated in the schematic representations of FIGS. 22-24.

The algorithm recognizes that faces $F_j$, are respective copies of face F through rigid motions $D_j$. Consequently, 2D local maps $q_j$ so that $D_j \circ S \circ q_j = S_j$ for j=1, . . . , m are provided, as well as 1D local maps $r_i^j$ so that $p_i^j = q_j^{-1} \circ p_i \circ r_i^j$ for i=1, . . . , m and j=1, . . . , n. The data structure representing the compressed model is illustrated on FIGS. 25-27 for n=4 and m=2. It should be noticed that each 2D local map is shared by all p-curves on the same surface. The mathematical description of each surface $S_j$ is replaced by a constant size block of data 260 including a pointer (to the reference surface S), the rigid motion (seven real numbers) and the 2D local map (six real numbers). The mathematical description of each p-curve $p_i^j$ is replaced by a constant size block of data 260 including a pointer (to the reference p-curve $p_i$) and the 1D local map $r_i^j$ (two real numbers).

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method for compressing a three-dimensional modeled object, wherein the method comprises:
   providing an input boundary representation of the modeled object, the input boundary representation comprising geometrical data, the geometrical data including functions each corresponding to a respective geometrical entity, each function having a domain and a range, the functions including:
      a reference function corresponding to a reference geometrical entity, the reference geometrical entity being obtained by applying the reference function; and
      another function corresponding to another geometrical entity, the other geometrical entity being obtainable by applying the other function;
   producing first data, that describe a mapping from the range of the reference function to the range of the other function, and second data, that describe a mapping from the domain of the other function to the domain of the reference function which, when composed with the reference function and the mapping from the range of the reference function to the range of the other function results in the other geometrical entity; and
   determining an output boundary representation, the output boundary representation comprising the geometrical data with the other function replaced by the first data, the second data and a pointer to the reference function, the output boundary representation comprising a compressed modeled object usable by a CAD (Computer-aided Design) system.

2. The method of claim 1, wherein the method comprises:
   determining sets of functions corresponding to geometrical entities that are a copy one of another,
   determining a reference function of the set within each set, and
   repeating, for each set and for each function of the set other than the reference function of the set, the step of determining the first data and the second data and the step of replacing, the reference function of determining the first data and the second data being each time the reference function of the set.

3. The method of claim 2, wherein the functions comprise parametric functions, and the mapping from the range of the reference function to the range of the other function and the mapping from the domain of the other function to the domain of the reference function are affine mappings.

4. The method of claim 2, wherein the geometrical entities that are a copy one of another are not parallel.

5. The method of claim 3, wherein the functions comprise surface definitions, the mapping from the range of the reference function to the range of the other function being a rigid motion that transforms the surface corresponding to the reference function into the surface corresponding to the other function, and the mapping from the domain of the other function to the domain of the reference function being a 2D local map.

6. The method of claim 5, wherein the functions further comprise p-curves having a range included in the domain of a respective surface definition, the mapping from the range of the reference function to the range of the other function being the inverse of a 2D local map from the range of the other function to the range of the reference function, and the mapping from the domain of the other function to the domain of the reference function being a 1D local map.

7. The method of claim 5, wherein the rigid motion includes a non-zero rotation component.

8. The method of claim 6, wherein the functions define faces that are a copy one of the other, with one reference surface definition, at least one other surface definition, a reference set of at least one p-curve having a range included in the domain of the reference surface definition and another set of at least one p-curve having a range in the domain of the other surface definition and corresponding to a respective one of the reference set, wherein the replacing includes replacing the other surface definition and the other set by data describing a pointer to the reference surface definition, for each one of the other set a pointer to the corresponding one of the reference set, a rigid motion that transforms the surface corresponding to the reference surface definition into the surface corresponding to the other surface definition, a 2D local map between the domain of the other surface definition to the domain of the reference surface definition, and a 1D local map between the domain of each one of the other set to the domain of the corresponding one of the reference set.

9. A three-dimensional modeled object obtainable by the method of claim 1.

10. A data file storing the three-dimensional modeled object of claim 7.

11. A computer-implemented method for decompressing a three-dimensional modeled object, the method comprising:
   (a) providing a three-dimensional modeled object obtained by:

having an input boundary representation of the modeled object, the input boundary representation comprising geometrical data, the geometrical data including functions each corresponding to a respective geometrical entity, each function having a domain and a range, the functions including:
  a reference function corresponding to a reference geometrical entity, the reference geometrical entity being obtained by applying the reference function; and
  another function corresponding to another geometrical entity, the other geometrical entity being obtainable by applying the other function;
producing first data, that describe a mapping from the range of the reference function to the range of the other function, and second data, that describe a mapping from the domain of the other function to the domain of the reference function which, when composed with the reference function and the mapping from the range of the reference function to the range of the other function results in the other geometrical entity; and
determining an output boundary representation, the output boundary representation comprising the geometrical data with the other function replaced by the first data, the second data and a pointer to the reference function,
(a) resulting in the three-dimensional modeled object usable by a CAD (Computer-aided Design) system;
(b) identifying the reference function with the pointer to the reference function; and
(c) composing the mapping from the domain of the other function to the domain of the reference function with the reference function then with the mapping from the range of the reference function to the range of the other function.

12. A computer program product comprising:
a non-transitory computer readable storage medium having recorded thereon computer program instructions for compressing a three-dimensional modeled object; and
the computer program instructions causing a processor to:
provide an input boundary representation of the modeled object, the input boundary representation comprising geometrical data, the geometrical data including functions each corresponding to a respective geometrical entity, each function having a domain and a range, the functions including:
  a reference function corresponding to a reference geometrical entity, the reference geometrical entity being obtained by applying the reference function; and
  another function corresponding to another geometrical entity, the other geometrical entity being obtainable by applying the other function;
produce first data, that describe a mapping from the range of the reference function to the range of the other function, and second data, that describe a mapping from the domain of the other function to the domain of the reference function which, when composed with the reference function and the mapping from the range of the reference function to the range of the other function results in the other geometrical entity; and
determine an output boundary representation, the output boundary representation comprising the geometrical data with the other function replaced by the first data, the second data and a pointer to the reference function, the output boundary representation comprising a compressed modeled object usable by a CAD (Computer-aided Design) system.

13. A computer program product of claim 12 wherein the computer program instructions further cause the processor to:
  determine sets of functions corresponding to geometrical entities that are a copy one of another,
  determine a reference function of the set within each set, and
  repeat, for each set and for each function of the set other than the reference function of the set, the step of determining the first data and the second data and the step of replacing, the reference function of determining the first data and the second data being each time the reference function of the set.

14. A computer program product of claim 12 wherein the computer program instructions further cause a computer to decompress the three-dimensional modeled object by:
  identifying the reference function with the pointer to the reference function; and
  composing the mapping from the domain of the other function to the domain of the reference function with the reference function then with the mapping from the range of the reference function to the range of the other function.

15. A CAD (Computer-aided Design) system comprising:
a memory;
a processor coupled to the memory and a graphical user interface, the memory having recorded thereon a computer program for compressing a three-dimensional modeled object by instructing the processor to:
provide an input boundary representation of the modeled object, the input boundary representation comprising geometrical data, the geometrical data including functions each corresponding to a respective geometrical entity, each function having a domain and a range, the functions including:
  a reference function corresponding to a reference geometrical entity, the reference geometrical entity being obtained by applying the reference function; and
  another function corresponding to another geometrical entity, the other geometrical entity being obtainable by applying the other function;
produce first data, that describe a mapping from the range of the reference function to the range of the other function, and second data, that describe a mapping from the domain of the other function to the domain of the reference function which, when composed with the reference function and the mapping from the range of the reference function to the range of the other function results in the other geometrical entity; and
determine an output boundary representation, the output boundary representation comprising the geometrical data with the other function replaced by the first data, the second data and a pointer to the reference function.

16. The CAD system as claimed in claim 15 wherein the processor further:
  determines sets of functions corresponding to geometrical entities that are a copy one of another,
  determines a reference function of the set within each set, and
  repeats, for each set and for each function of the set other than the reference function of the set, the step of determining the first data and the second data and the step of replacing, the reference function of determining the first data and the second data being each time the reference function of the set.

17. The CAD system as claimed in claim 16 wherein the functions comprise parametric functions, and the mapping from the range of the reference function to the range of the other function and the mapping from the domain of the other function to the domain of the reference function are affine mappings.

18. The CAD system as claimed in claim 16 wherein the geometrical entities that are a copy one of another are not parallel.

19. The CAD system as claimed in claim 17 wherein the functions comprise surface definitions, the mapping from the range of the reference function to the range of the other function being a rigid motion that transforms the surface corresponding to the reference function into the surface corresponding to the other function, and the mapping from the domain of the other function to the domain of the reference function being a 2D local map.

20. The CAD system as claimed in claim 19 wherein the functions further comprise p-curves having a range included in the domain of a respective surface definition, the mapping from the range of the reference function to the range of the other function being the inverse of a 2D local map from the range of the other function to the range of the reference function, and the mapping from the domain of the other function to the domain of the reference function being a 1D local map.

21. The CAD system as claimed in claim 19 wherein the rigid motion includes a non-zero rotation component.

22. The CAD system as claimed in claim 20 wherein the functions define faces that are a copy one of the other, with one reference surface definition, at least one other surface definition, a reference set of at least one p-curve having a range included in the domain of the reference surface definition and another set of at least one p-curve having a range in the domain of the other surface definition and corresponding to a respective one of the reference set, wherein the replacing includes replacing the other surface definition and the other set by data describing a pointer to the reference surface definition, for each one of the other set a pointer to the corresponding one of the reference set, a rigid motion that transforms the surface corresponding to the reference surface definition into the surface corresponding to the other surface definition, a 2D local map between the domain of the other surface definition to the domain of the reference surface definition, and a 1D local map between the domain of each one of the other set to the domain of the corresponding one of the reference set.

\* \* \* \* \*

UNITED STATES PATENT AND TRADEMARK OFFICE
CERTIFICATE OF CORRECTION

PATENT NO.         : 9,881,388 B2
APPLICATION NO.    : 14/286952
DATED              : January 30, 2018
INVENTOR(S)        : Remy Rorato and Nicolas Duny It is certified that error appears in the above-identified patent and that said Letters Patent is hereby corrected as shown below:

In item (71) Applicant, delete "Systemes" and insert --Systèmes--

In item (73) Assignee, delete "Systemee" and insert --Systèmes--

Signed and Sealed this
Third Day of April, 2018

Andrei Iancu
*Director of the United States Patent and Trademark Office*